US010332181B1

(12) United States Patent
McAllister et al.

(10) Patent No.: US 10,332,181 B1
(45) Date of Patent: Jun. 25, 2019

(54) RANKING SEARCH RESULTS AND RECOMMENDATIONS

(71) Applicant: Amazon Technologies, Inc., Seattle, WA (US)

(72) Inventors: Vevina Mariam McAllister, San Francisco, CA (US); Wesley Scott Lauka, Seattle, WA (US); Shirley Yiong, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 929 days.

(21) Appl. No.: 14/687,667

(22) Filed: Apr. 15, 2015

(51) Int. Cl.
 *G06Q 30/00* (2012.01)
 *G06Q 30/06* (2012.01)
 *G06F 16/2457* (2019.01)

(52) U.S. Cl.
 CPC ... *G06Q 30/0629* (2013.01); *G06F 16/24578* (2019.01)

(58) Field of Classification Search
 CPC .............. G06Q 30/0629; G06F 16/24578
 USPC ................................ 705/26.1–27.2
 See application file for complete search history.

(56) References Cited

U.S. PATENT DOCUMENTS

| 8,266,014 B1* | 9/2012 | Bhosle | G06Q 30/0278 705/26.7 |
| 2003/0093338 A1* | 5/2003 | Kim | G06Q 30/02 705/26.7 |
| 2007/0073641 A1* | 3/2007 | Perry | G06F 17/30699 |
| 2009/0234722 A1* | 9/2009 | Evevsky | G06Q 30/02 705/14.1 |

OTHER PUBLICATIONS

Moran, G. (2005). Bricks & clicks: Boost both retail and e-tail sales by posting your products on eBay. Entrepreneur, 33(10), 64(4). Retrieved from https://dialog.proquest.com/professional/docview/674627308?accountid=142257 (Year: 2005).*

* cited by examiner

*Primary Examiner* — Jason B Dunham
*Assistant Examiner* — Anand R Loharikar
(74) *Attorney, Agent, or Firm* — Athorus, PLLC

(57) ABSTRACT

When a user selects an item at an online marketplace and subsequently provides a search query to the online marketplace, search results or recommendations received from the online marketplace in response to the search query may be displayed based on whether the search results or recommendations would satisfy a requirement established by a source of the selected item. The requirement may relate to a minimum cost threshold, or a minimum number of items. Any search results or recommendations that would, if selected, cause the requirement to be met or exceeded may be preferentially displayed to the user above, or in a more prominent manner, than search results or recommendations that would not, if selected, cause the requirement to be met or exceeded.

13 Claims, 15 Drawing Sheets

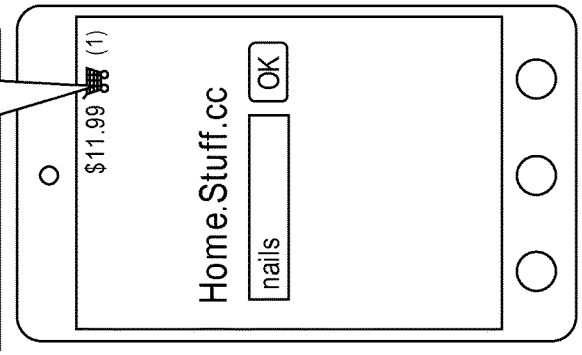

ITEMS IDENTIFIED BASED ON
SECOND SEARCH QUERY PREFERENTIALLY
RANKED BASED ON MERCHANT A LIMITS

| Item | Cost | Merchant |
|---|---|---|
| 448 — 18-ga. 1 1/4" brad nails, 2000 qty | $9.44 | A |
| 458 — framing nails, 1000 qty | $22.94 | A |
| 462 — Nail Your Next Audition (2006) | $26.59 | A |
| 466 — nail lacquers, pastel colors | $7.74 | A |
| 454 — finishing nails, 50 pc. | $2.49 | A |
| 446 — spike nails, galvanized, 10", 5 lbs. | $12.85 | C |
| 442 — duplex nails, #8 x 3", 10 lb. | $14.99 | B |
| 450 — sinker nails, #11, steel, 5 lb. | $9.87 | B |
| 452 — roofing nails, galvanized, 1 lb. | $2.98 | C |
| 444 — floor metal screw nails, 1 1/4" | $2.50 | C |
| 456 — finish nails, #15, 1 lb. | $3.47 | B |
| 460 — Liquid Nails LN950 10 oz. | $10.23 | B |
| 440 — joist hanger nails, 2 1/2 lb. | $9.99 | C |
| 464 — nail clippers | $5.97 | B |
| 468 — nail polish, 24 colors | $19.95 | C |

FIG. 4B

WOODEN CLAW HAMMER, 20 OZ., WITH FIBERGLASS HANDLE, OFFERED BY MERCHANT A FOR $11.99 SELECTED BASED ON FIRST SEARCH QUERY OF "HAMMER"

$11.99 (1)

Home.Stuff.cc nails    OK

MERCHANT A LIMITS
TWO ITEMS, $20.00

RANKING SEARCH RESULTS AND RECOMMENDATIONS

BACKGROUND

Online marketplaces enable customers to search for or browse information regarding items that are available for purchase from a variety of sources and in a variety of ways through one or more networked pages or sites. For example, an online marketplace may offer items for sale that it owns and controls, as well as items that are owned by sellers, via one or more web pages or web sites. The sellers may elect to either deliver their items to a facility maintained by the online marketplace for distribution to customers; or maintain control over their items themselves, and cause ordered items to be delivered directly to customers who purchased one or more of the items.

When a seller offers items for sale on an online marketplace, the seller may do so subject to one or more conditions that it may define. Such conditions may include fees, minimum numbers or costs of items purchased, specific delivery times or other prerequisites. Additionally, the seller may establish such conditions based on any relevant factor, including but not limited to the costs that the seller may incur in offering the items for sale at the online marketplace, minimum or maximum capacity thresholds, or any other factors.

Recently, online marketplaces have begun to offer enhanced delivery services on orders for specific items in selected areas, usually areas having high population densities or concentrations of retail operations within short ranges. In some implementations, an online marketplace may offer short-term delivery services for orders of items that the online marketplace owns or controls (e.g., items that the online marketplace stores or possesses within a storage area of one of its warehouses or other storage facilities), or items that the online marketplace knows or believes to be reliably available on short notice (e.g., items that the online marketplace may obtain from one or more merchants within a close proximity).

In this regard, some online marketplaces are now configured to receive orders from customers, locate some or all of the items within facilities under their control, or identify one or more merchants having access to such items, and dispatch one or more agents or workers to transport the ordered items from the facilities or obtain the ordered items from the one or more merchants (e.g., preferably from merchants located along or near a route between a fulfillment center and a customer who ordered the items), before delivering the items to the customers who ordered them. In particularly dense environments, with sufficiently large and diverse item inventories both within online marketplace facilities or via nearby retailers, an online marketplace may offer delivery services to customers within as little as one hour.

BRIEF DESCRIPTION OF THE DRAWINGS

FIGS. 4A and 4B are views of aspects of one system for ranking search results or recommendations in accordance with embodiments of the present disclosure.

DETAILED DESCRIPTION

As is set forth in greater detail below, the present disclosure is directed to displaying information regarding one or more items in a ranked format that considers not only attributes of the items and their respective relationships with the user but also extrinsic factors pertaining to entities affiliated with each of the items, or requirements associated with one or more of the entities. More specifically, the present disclosure is directed to displaying a list of search results or recommendations, e.g., information regarding one or more items that are available for purchase at an online marketplace, in response to a query provided by a customer, or in response to one or more actions taken by the customer. The search results or recommendations may be displayed in the list in a non-traditional ranked format that considers not only one or more attributes of the search results or recommendations, e.g., the prices of items, or their relevance to a customer, or the customer's preferences for the search results or recommendations, but also extrinsic factors such as delivery costs, minimum prices, numbers or volumes or thresholds or other requirements associated with such search results or recommendations that may be assigned by their respective sources.

In this regard, search results or recommendations may be displayed in a reprioritized manner based on a global condition of an order for one or more items, and how the addition of one or more of items associated with such search results or recommendations, from any number of sources, may affect the global condition of the order. The systems and methods of the present disclosure may, therefore, effectively maintain different virtual shopping carts for each of the merchants from which a user has selected items, identify one or more requirements associated with each of such merchants, determine whether the requirements associated with such merchants are met based on the contents of such virtual shopping carts, and preferentially display search results or recommendations to the user in a manner that elevates or otherwise emphasizes items associated with such search results or recommendations that would meet or exceed, or avoid running afoul of, one or more of such requirements.

Figure 1A:
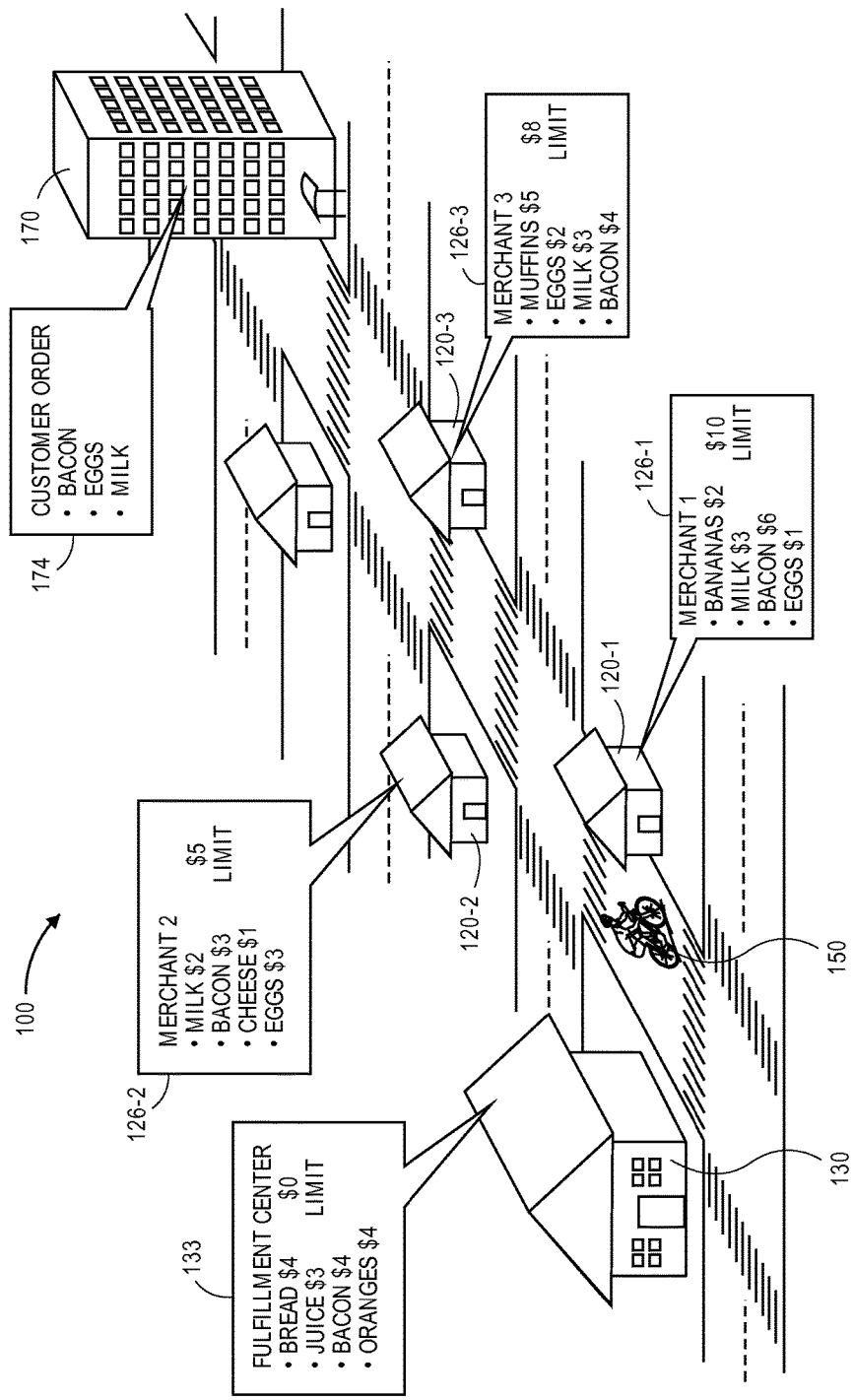
FIGS. 1A through 1E are views of aspects of one system for ranking search results or recommendations in accordance with embodiments of the present disclosure.

Referring to FIGS. 1A through 1E, views of one system 100 for ranking search results or recommendations in accordance with embodiments of the present disclosure are shown. As is shown in FIG. 1A, the system 100 includes a plurality of merchants 120-1, 120-2, 120-3, a fulfillment center 130, a worker 150 and a customer 170 located near one another. Each of the merchants 120-1, 120-2, 120-3 has a set of items 126-1, 126-2, 126-3 in inventory, and the fulfillment center 130 also has a set of items 133 in inventory. Additionally, the fulfillment center 130 and each of the merchants 120-1, 120-2, 120-3 has an associated operational limit, constraint or other requirement (e.g., a total number or value of items selected) that must be met or exceeded in order to execute a purchase through the fulfillment center 130 or the merchants 120-1, 120-2, 120-3, or to avoid paying a surcharge or other fee for such a purchase.

The customer 170 is able to place an order 174 at an online marketplace associated with the fulfillment center 130, e.g., via a computer device such as a smartphone, a laptop computer, a desktop computer, or any other Internet-enabled device. The order 174 may be fulfilled with items that are maintained within the inventory 133 of the fulfillment center 130, or, alternatively, within the inventories 126-1, 126-2, 126-3 of the one or more of the merchants 120-1, 120-2, 120-3, and subsequently delivered to the customer 170 by the worker 150.

Figures 1B, 1C:
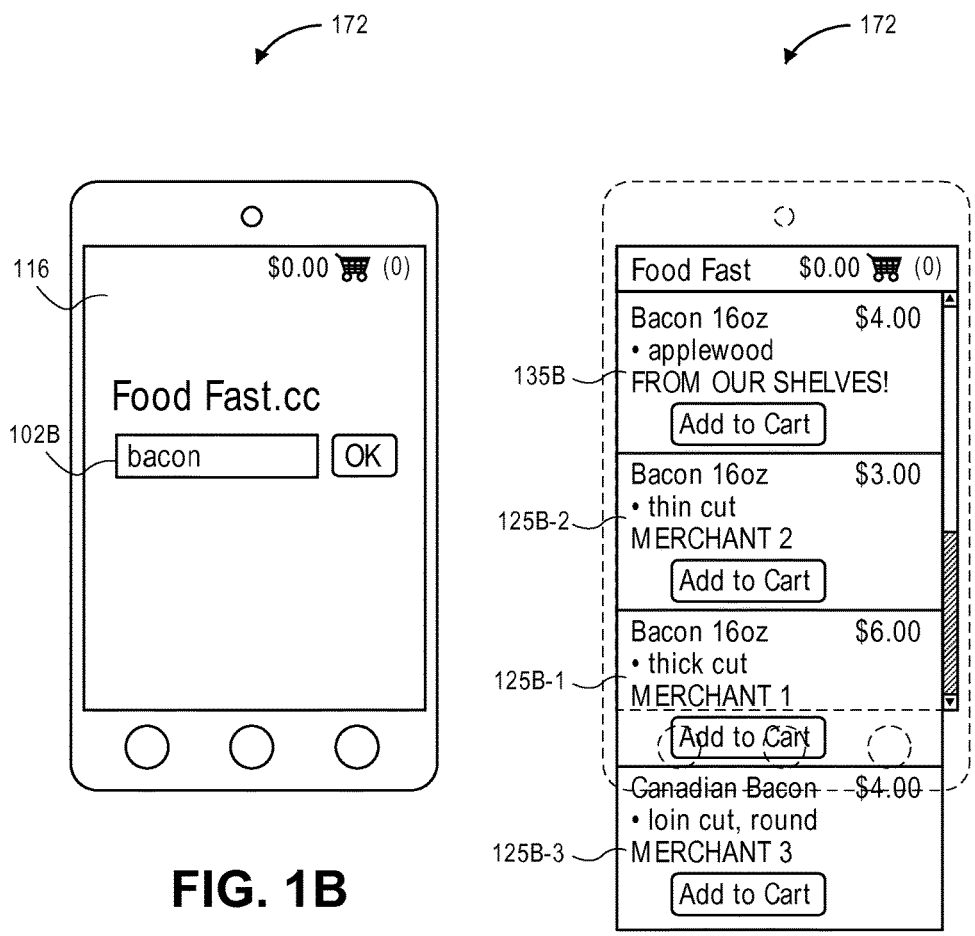

Referring to FIGS. 1B through 1E, the customer 170 may place the order 174 for a plurality of items via a web site 116 using a smartphone 172. As is shown in FIG. 1B, the customer 170 may provide a search query 102B (viz., "bacon") to the web site 116, and the search query 102B may be provided from the smartphone 172 to the online marketplace (not shown) via one or more wired or wireless connections to a network, such as the Internet.

As is shown in FIG. 1C, upon receiving the search query 102B, the online marketplace may return a list of search results 135B, 125B-2, 125B-1, 125B-3 identifying items which pertain to the search query 102B that are available at either the fulfillment center 130 or accessible to one or more of the merchants 120-1, 120-2, 120-3, and the list of the search results 135B, 125B-2, 125B-1, 125B-3 may be displayed on the smartphone 172. Because the fulfillment center 130 and each of the merchants 120-1, 120-2, 120-3 possesses or has access to items responsive to the search query 102B, the search results 135B, 125B-2, 125B-1, 125B-3 identify items that are maintained within the inventory 133 of the fulfillment center 130 (viz., search result 135B), and items that are accessible to one or more of the merchants 120-1, 120-2, 120-3 in their respective inventories 126-1, 126-2, 126-3 (viz., search results 125B-1, 125B-2, 125B-3, respectively). The search results 135B, 125B-2, 125B-1, 125B-3 further include features for adding any of the items associated with the respective search results to a virtual shopping cart, or to otherwise execute a purchase for one or more of the items. As is shown in FIG. 1C, the search results 135B, 125B-2, 125B-1, 125B-3 are typically ranked based on their respective relevance to the search query 102B, on a preference of the customer 170 or one or more like customers, e.g., a preferred source, type or kind of item preferred by the customer 170 or the one or more like customers, or on a combination of the relevance of the search results 135B, 125B-2, 125B-1, 125B-3 to the search query 102B and one or more preferences of the customer 170 or like customers.

Figure 1D:
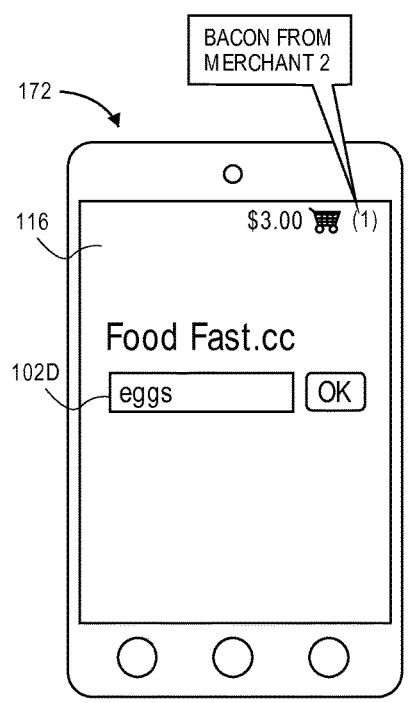
Figure 1E:
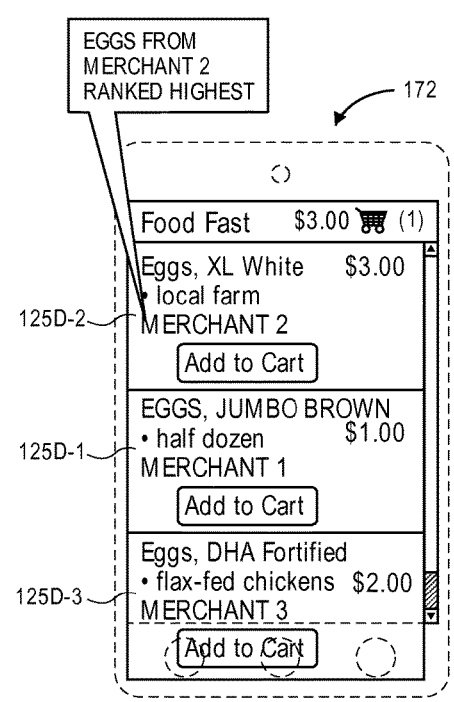

Referring to FIGS. 1D and 1E, after the customer 170 selects one or more of the search results 135B, 125B-2, 125B-1, 125B-3 (viz., the search result 125B-2), an item associated with the selected search result 125B-2 is added to the virtual shopping cart, and the customer 170 may continue to search for additional items based on one or more other search queries. As is shown in FIG. 1D, the customer 170 may enter a search query 102D (viz., "eggs") at the web site 116, which has been updated to reflect an addition of an item associated with the search result 125B-2 to the virtual shopping cart. The search query 102D may then be provided from the smartphone 172 to the online marketplace (not shown). As is shown in FIG. 1E, upon receiving the search query 102D, the online marketplace may return a list of search results 125D-2, 125D-1, 125D-3 pertaining to the query 102D. Because each of the merchants 120-1, 120-2, 120-3 possesses or has access to items responsive to the search query 102D, and the fulfillment center 130 does not, the search results 125D-2, 125D-1, 125D-3 identify items that are accessible to one or more of the merchants 120-1, 120-2, 120-3 in their respective inventories 126-1, 126-2, 126-3 (viz., search results 125D-1, 125D-2, 125D-3, respectively).

In accordance with the present disclosure, and as is shown in FIG. 1E, the search results 125D-1, 125D-2, 125D-3 are ranked in an order with respect to a selection of any of the search results 125D-1, 125D-2, 125D-3 that would meet or exceed any requirements established by one or more of the merchants 120-1, 120-2, 120-3. Such requirements may include, but are not limited to, delivery costs, minimum prices, numbers, volumes or thresholds or other requirements. For example, as is shown in FIG. 1A, the merchant 120-2 has a five dollar ($5) minimum purchase requirement and, as is shown in FIG. 1C, the customer 170 has added the item associated with the search result 125B-2, which has a price of three dollars ($3), to the virtual shopping cart. Therefore, in order to meet the minimum purchase requirement associated with the merchant 120-2, from which the customer 170 has already selected an item, the customer 170 must further add items totaling at least two dollars ($2) in price, in the aggregate.

In accordance with some embodiments of the present disclosure, as is shown in FIG. 1E, the search result 125D-2, which identifies an item from the merchant 120-2 having a price of three dollars ($3), is preferentially ranked above the search results 125D-1, 125D-3, in the list of the search results 125D-1, 125D-2, 125D-3 returned to the smartphone 172 in response to the search query 102D. Even though each of the search results 125D-1, 125D-3 identifies items having lower costs (viz., one dollar and two dollars, or $1 and $2, respectively) than the item identified in the search result 125D-2, the search result 125D-2 is preferentially ranked above the search results 125D-1, 125D-3 because adding the search result 125D-2 to the virtual shopping cart would meet or exceed the minimum purchase requirement of five dollars ($5) set by the merchant 120-2, and because adding either the search result 125D-1 or the search result 125D-3 to the virtual shopping cart would subject the customer 170 to the minimum price requirements of ten dollars ($10) and eight dollars ($8) set by the merchant 120-1 and the merchant 120-3, respectively, which would not be met by either addition.

Accordingly, the systems and methods of the present disclosure may preferentially rank search results identified in response to a search query provided by a user based not only on their relevance to the search query, or on one or more preferences of the user or like users, but on extrinsic factors or requirements, e.g., limits, restrictions, constraints, prerequisites or other requirements associated with one or more merchants or other sources of items, and whether a selection of one or more of the search results would comply with one or more of such factors, or meet or exceed one or more of such requirements. For example, where one or more items identified in response to a search query provided by a customer would, if selected, meet or exceed a price threshold or other requirement of a merchant having access to the items, or to other items selected by the customer, such items may be ranked more highly or emphasized more strongly than other items, including but not limited to items which would not meet or exceed any relevant requirements. Likewise, where one or more items identified in response to the search query would, if selected, cause the customer to run afoul of or not meet or exceed one or more requirements, such items may be ranked below or deemphasized with respect to other items, including but not limited to items which would meet or exceed such requirements.

Similarly, the systems and methods of the present disclosure may also surface recommendations of items to a user ranked based not only on their relevance to one or more items previously selected by the user, or on one or more preferences of the user or like users, but on extrinsic factors or requirements, and whether a selection of one or more of the recommended items would comply with one or more of such factors, or meet or exceed one or more of such requirements. The recommendations may be identified on any basis and in response to any action by a user, including items identified following a prior selection of an item, or items identified following or during an entry of all or a portion of a search query (e.g., automatically, as the search query is being entered into a text box of a search engine).

Therefore, in some embodiments of the present disclosure, a resulting display of items in response to a search query, or a display of recommendations of items, may be defined not only based on the various attributes of each of the items, or their relation to the user or the user's preferences, but also based on one or more other considerations, such as whether a selection of the item may satisfy a prerequisite defined by a source associated with the item (or other items), whether the selection of the item may otherwise reduce the overall cost of an order, or whether the selection of the item may result in an earlier delivery time. In particular, according to some embodiments of the present disclosure, search results associated with items, or recommendations of items, may be preferentially displayed based on whether a selection of one or more of the items would satisfy a predetermined prerequisite or threshold, or otherwise avoid resulting in increased costs, charges or delays. In this regard, the ranked order of the items displayed to a user may reflect their true value to the customer in a manner that is not apparent in view of the intrinsic attributes of the items, considered individually or collectively, or without regard to any requirements established by sources of the items.

Online marketplaces typically maintain networked sites (e.g., web sites) or other online portals that may be used to offer items of any kind for sale to customers. A site or portal maintained by an online marketplace typically includes one or more interactive features which permit customers to search for or browse information regarding any number of items, and to execute one or more interactions for ordering one or more of the items for delivery.

Items that are offered for sale at an online marketplace may originate from any number or type of sources, including one or more merchants of such items, or from the online marketplace itself. A merchant may elect to make its items available for sale through an online marketplace in any number of ways, and on any terms that may be agreed upon between the merchant and the online marketplace. For example, a merchant may sell items to the online marketplace directly, either singly or in bulk, for their ultimate resale to customers. The online marketplace may then place the items in storage, generate one or more interactive network pages including information regarding the items (e.g., a name and/or image of an item, a cost of the item, an item number or part number for the item, dimensions or features of the item, as well as customer ratings or reviews of the item), along with features for purchasing the items (e.g., links, buttons or other features for adding the item to a virtual shopping cart or wish list, for purchasing the items outright, or for recommending the item to one or more friends, family members or colleagues), and make such "detail" pages available to customers over a network, such as the Internet. When a customer places an order for one of the items through one or more detail pages at the online marketplace, a transaction may be executed between the online marketplace and the customer, and the ordered item may be retrieved from storage, prepared for delivery, and shipped to the customer.

Additionally, the merchant may deliver items to the online marketplace on consignment, and the items may be placed in a fulfillment center or other designated location or facility under the control of the online marketplace on behalf of the merchant. The online marketplace may then generate one or more interactive detail pages for the items, and make such detail pages available to customers. When a customer places an order for one of the items that has been delivered to the online marketplace under consignment, a transaction may be executed between the online marketplace and the customer. The online marketplace may then receive funds from the customer in exchange for the ordered item, retrieve the ordered item from the fulfillment center or other designated location, deliver the ordered item to the customer from the fulfillment center or other designated location to the customer, and remit funds for the purchase of the ordered item to the merchant, less any applicable service fees or charges that may be due and owing.

Also, a merchant may maintain control over the items that it intends to offer for sale through the online marketplace, but may merely provide information regarding the offered items to the online marketplace. The online marketplace may then generate one or more interactive detail pages for the items, and make such detail pages available to customers. When a customer places an order for an item that is held by the merchant, a transaction may be executed between the online marketplace and the customer. The online marketplace may then receive funds from the customer in exchange for the ordered item, and provide information regarding the customer and the order (e.g., specifications of the ordered item and a shipping address or destination for the ordered item) to the merchant, with respect to either an individual order or a number of orders, along with an instruction to deliver the ordered item to the customer. The merchant may then arrange for the delivery of the item to an address or destination specified by the customer, and receive funds for the purchase of the ordered item from the online marketplace, less any applicable service fees or charges that may be due and owing.

A search engine is a computer-based module for retrieving information or data distributed across a network, e.g., in one or more physical or virtual data stores. A user may provide a search query comprised of one or more keywords to a search engine by a browser or other application. A browser is designed to receive requests for Internet or network-based resources from users on a local or client-side device, to transmit requests for coded information corresponding to the requested network-based resources to a remote or server-side application, to receive coded information corresponding to the requested resources from the remote or server-side applications, and to render the requested resources on a display screen on the local or client-side device. Other applications operating on local or client-side devices may perform similar functions for searching indexed information in a similar manner.

Thus, when a user provides a search query to a browser or like application operating on a computer device, e.g., by typing the one or more keywords of the search query into a text box, the browser or like application may receive search results pertaining to the search query, and render one or more of the search results on a display of the computer device. Typically, information or data pertaining to search results is listed in a ranked order of relevance or priority based on a relationship between each of the search results and the search query itself, on attributes of a user, or on attributes of a context in which the search query is provided, e.g., a time or date on which the search query was entered, a location from which the search query was entered, a prior search history of the user, or on any other relevant factor.

A search query may comprise one or more keywords, or individual words or groupings of alphanumeric characters, as well as strings of multiple words or groupings of alphanumeric characters that may be separated by spaces, commas, dashes, colons, semicolons, or any other delimiter. Such keywords may be used to initiate searches, such as by entering a keyword into a search engine on a browser, or by selecting a keyword from a list, such as an online catalog. For example, the entry or selection of the keyword "boat" may return a different set of results than the entry or selection of the keyword "boat shoes," "gravy boat," or "Ryan Boatright." Additionally, a keyword can refer to a particular category (such as "snow blower" or "sports"), brand (such as "Goodyear"), or theme (such as "April Fool's Day"), either specifically or generally, and may also refer to one or more particular items (such as "Weber Genesis gas grill").

Search engines may be provided for general purposes, e.g., to return information or data pertaining to a search query from a broad network or system, or for one or more specific or targeted purposes. Commonly, an online marketplace may provide customers with a number of features that may be used to search or browse for items of interest, including one or more search engines which permit customers to perform keyword-based searches of an online catalog of items, or an array of selectable links or features, which permit customers to browse for items in one or more categories or groups. An entry of a search query into a search engine provided by an online marketplace, or a selection of a keyword-based category associated with the online marketplace, causes a display of an ordered list of items identified based on the entered search query or in the selected category.

The ordered list may include one or more interactive features or linked elements that may be selected in order to obtain additional information or data regarding one or more of the items, in the form of a details page. Such details pages may include one or more features for reviewing information regarding an item, for adding the item to a virtual "shopping cart," for placing the item on a registry or "wish list," for purchasing the item outright, or taking any other action with regard to the item. The detail page may include text, images or multimedia regarding the item, rankings or reviews of the item (which may be qualitative or quantitative in nature, and may be provided anonymously or with names of respective reviewers), as well as links to "chat rooms" or discussion forums, and may be linked or associated with one or more social networks or external sites or platforms. The detail page may also provide one or more selectable or adjustable features (e.g., radio buttons, drop-down menus or text boxes) that permit a customer to specify any attributes of a desired item (e.g., sizes, colors, models or accessories).

In particular, detail pages may also include advertisements for other recommended items that may complement or act as substitutes for an item. Such recommended items may be identified based on a searching, browsing or purchasing history of a user who provided a search query to the online marketplace, or on any known interests or attributes of the user. Alternatively, such recommended items may be identified based on searching, browsing or purchasing histories of other users who may have interests or attributes that are similar to those of the user who provided the search query, or on any other relevant factors. For example, some recommendations of items are substitutable items, e.g., items that may act as a substitute or replacement for one or more items previously reviewed or evaluated by the user, or one or more items previously selected and added to a virtual shopping cart by the user. Some other recommendations of items may be complementary items, e.g., items such as accessories or aids that may complement one or more items previously reviewed or evaluated by the user, or one or more items previously selected and added to a virtual shopping cart by the user. A list of recommendations displayed to a user may include substitutable items, complementary items, or both substitutable and complementary items.

Therefore, when visiting an online marketplace, a customer may execute any number of interactions with one or more web pages associated with the online marketplace, including web pages that are intrinsic to the online marketplace or web pages that may be hosted externally, such as by searching for items made available thereon by the owners or operators of the online marketplace or by one or more independent merchants, through the entry of any number of keywords into a search engine, or by browsing for items that have been designated and sorted into any number of categories. A customer may further select and view any number of item detail pages, read or provide any number of customer reviews or ratings of items, view any number of images of items (e.g., zoom or pan such images, or select alternate images or views of the item). Additionally, a customer may traverse through any amount or extent of one or more item detail pages or results lists, including information displayed in a top, bottom, or intermediate portion of such pages.

The efficiency with which customers may identify, evaluate and purchase items by way of an online marketplace, and have such items delivered to destinations of their choice, has rapidly improved in recent times. Currently, some online marketplaces, e.g., online marketplaces having fulfillment and distribution facilities in dense environments which may also feature large numbers of merchants, offer enhanced delivery options, such as same-day or Sunday delivery options, of some select items that are or may be expected to be available at short notice within close proximity to customers.

The systems and methods of the present disclosure are directed to ranking items in a list based on factors associated not with the items themselves, or a user who requested the list of items, but with sources or other entities associated with each of the items. For example, where a source of an item places a restriction on the item or on transactions involving the item (e.g., a minimum number of items to be purchased or a minimum total cost of such transactions), some embodiments of the systems and methods of the present disclosure may cause the item to be ranked above or below other items, or more prominently or less prominently than such other items, in a list of items displayed following an entry of a keyword or other search query into a search engine by a user or a selection of a keyword or other feature corresponding to a category by the user, or a list of recommendations of items displayed to the user, where a selection of the item would meet or exceed the restriction, or where the selection of the item would run afoul of or otherwise fail to meet or exceed the restriction.

The present disclosure thus effectively enables an online marketplace to define discrete virtual shopping carts for each of a plurality of merchants offering items at an online marketplace, and to determine whether any requirements associated with the purchase of items from such merchants may exist. Such virtual shopping carts may be maintained invisibly or otherwise beyond the purview of a customer, and monitored or tracked by the online marketplace with respect to each order placed by the customer. If a merchant sets a requirement (e.g., a minimum number or value of goods that must be purchased from the merchant in the abstract, or to avoid a delivery fee or other surcharge that may be assessed against a customer), then the systems and methods of the present disclosure may track the status of an order with respect to the requirement, and preferentially display items in a list that would meet or exceed the requirement, or otherwise avoid running afoul of the requirement.

The display of search results or recommendations in accordance with the present disclosure may be based on or driven by one or more rules which identify and consider attributes of items and, based on such attributes, determine whether a selection of one or more of such items would satisfy a requirement established by a source associated with such items. In this regard, the systems and methods of the present disclosure enable search results or recommendations to be ranked and displayed at a more granular, merchant-based level, based on the status of a customer's order, e.g., a number and aggregate cost of the items included in the order, with respect to one or more of the merchants. For example, a list of items identified in response to a query provided by a user or recommendations of items may be initially ranked in a traditional manner, e.g., based on the relevance of such results or recommendations to the query, to a previous selection of or interest in an item, or to the preferences of the user, in accordance with the present disclosure. In some embodiments, where a customer at an online marketplace enters a first search query or selects a first category of items, the online marketplace may display items responsive to the first search query or in the first category based on their respective relation to the first search query or their prominence within the first category, as well as the preferences of the customer or of like customers (e.g., other customers who have previously purchased the same items as the customer, or similar items, from the online marketplace).

For example, if two or more items have equal relevance to a query or to an item or other basis on which a recommendation is identified, then the items may be ranked according to a series of discrete rules. First, if any of the items identified is offered by a merchant from whom the customer has already selected one or more items, such items are ranked at a top of the list. Next, if two or more of the items ranked at the top of the list, e.g., items offered by merchants from whom the customer has already selected one or more items, have equal relevance, such items may be ranked as a function of their respective prices, based on how close a selection of the item will bring the customer to one or more requirements (e.g., minimum price requirements) set by each of the merchants. If two or more items ranked at the top of the list will bring the customer equally close to one or more requirements set by such merchants, then the item having the lowest price may be ranked first among such items. If two or more of such items have equally low prices, then the items may be ranked according to any other factor, e.g., alphabetically or on any other basis.

After a customer has selected one or more items, and subsequently enters a second search query or selects a second category, the online marketplace may display items responsive to the second search query or in the second category in a preferential manner that elevates or emphasizes items which would, if selected, meet or exceed requirements established by the merchants who offer the items previously selected by the customer for sale at the online marketplace, or would avoid running afoul of one or more other requirements established by such merchants. Alternatively, after the customer has selected one or more items, a list of recommended items may be displayed to the user in a preferential manner that elevates or emphasizes recommended items which would, if selected, meet or exceed requirements established by the merchants who offer the items previously selected by the customer for sale at the online marketplace, or would avoid running afoul of one or more other requirements established by such merchants.

According to some embodiments of the present disclosure, after one or more items has been selected by a customer, e.g., following the entry of a search query, or the selection of a category by the customer, and a list of other items is displayed to or requested by the customer, e.g., based on the items selected by the customer, or following the entry of another search query or another selection of a category by the customer, the list of other items may be preferentially ranked and displayed to a user in a manner that elevates or emphasizes items which would meet or exceed any requirements associated with merchants of the previously selected items, or avoid running afoul of any requirements associated with such items or such merchants.

According to some other embodiments of the present disclosure, items that would meet or exceed a relevant requirement, e.g., a minimum cost requirement or threshold, associated with a merchant of one or more previously selected items may be preferentially ranked first in a list of items responsive to a search query or within a selected category. Thereafter, items which would most closely approach the requirement, e.g., items having costs which would come closest to meeting or exceeding the minimum cost requirement, or items offered by other merchants for which all relevant requirements have been met or exceeded, may be ranked next in the list. Finally, items available from other merchants, or items related to other search queries or in other categories, may be ranked next in the list.

According to still other embodiments of the present disclosure, items that would correspond to a requirement that has already been satisfied, e.g., items offered by a merchant for which a minimum cost threshold has already been met or exceeded, may be preferentially ranked and displayed to a user in a manner that elevates or emphasizes such items as compared to items offered by merchants for which a requirement has not been satisfied, or items that would, if selected, create or exacerbate an issue with respect to one or more requirements, e.g., items offered by merchants for which minimum cost thresholds have not been met.

According to yet other embodiments of the present disclosure, after a first item offered by a first merchant is selected by a customer, and a second item offered by a second merchant is selected by the customer, the systems and methods of the present disclosure may determine whether the first item is available from the second merchant, and whether a combination of the first item and the second item would, if purchased from the second merchant, meet or exceed a requirement of the second merchant. If the requirement of the second merchant would be met by purchasing the first item and the second item together from the second merchant, the customer may be prompted to indicate whether he or she is willing to do so, or whether the customer intends to purchase the first item and the second item from the first merchant and the second merchant, respectively. The evaluation of the contents of an order may continue, on an iterative basis, with each respective selection of an item, and with regard to all or a portion of the items in the order.

Figure 2:
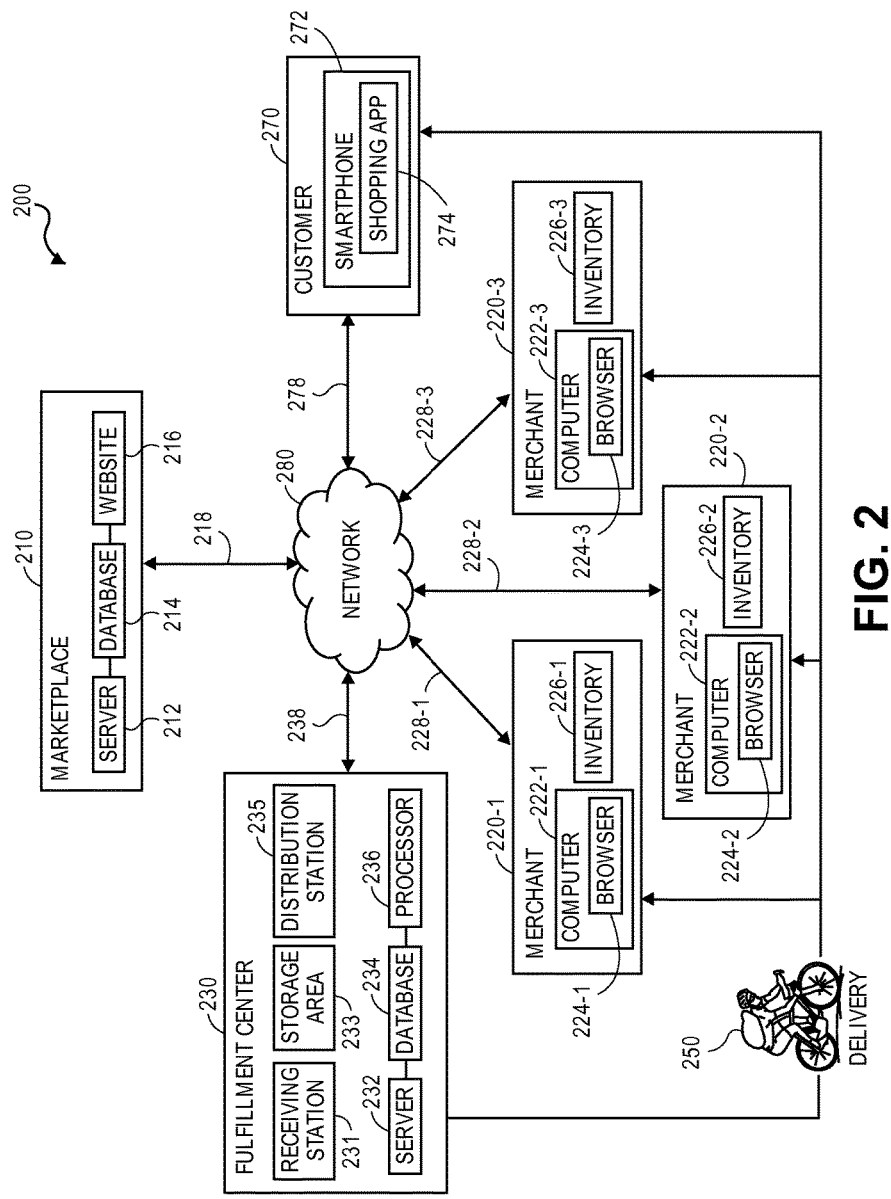
FIG. 2 is a block diagram of components of one system for ranking search results or recommendations in accordance with embodiments of the present disclosure.

Referring to FIG. 2, a block diagram of components of one system 200 for ranking search results or recommendations in accordance with embodiments of the present disclosure is shown. The system 200 includes a marketplace 210, a plurality of merchants 220-1, 220-2, 220-3, a fulfillment center 230, a worker 250 and a customer 270 that are connected to one another across a network 280, such as the Internet. Except where otherwise noted, reference numerals preceded by the number "2" shown in FIG. 2 indicate components or features that are similar to components or features having reference numerals preceded by the number "1" shown in FIGS. 1A through 1E.

The marketplace 210 may be any entity or individual that wishes to make items from a variety of sources (e.g., manufacturers, merchants, sellers or vendors) available for download, purchase, rent, lease or borrowing by customers using a networked computer infrastructure, including one or more physical computer servers 212 and data stores (e.g., databases) 214 for hosting a web site 216 or other network site. The marketplace 210 may be physically or virtually associated with one or more storage or distribution facilities, including but not limited to the fulfillment center 230. The web site 216 may be implemented using the one or more servers 212, which connect or otherwise communicate with the one or more data stores 214 as well as the network 280, as indicated by line 218, through the sending and receiving of digital data. The servers 212 may cause the display of information associated with the web site 216 in any manner, e.g., by transmitting code such as Hypertext Markup Language (HTML), over the network 280 to another computing device that may be configured to generate and render the information into one or more pages and to display such pages on a computer display of any kind. Moreover, the data store 214 may include any type of information regarding items that have been made available for sale through the marketplace 210, or ordered by customers from the marketplace 210.

The merchants 220-1, 220-2, 220-3 may be any entities or individuals that intend to make one or more items available to customers, such as the customer 270, by way of the marketplace 210. The merchants 220-1, 220-2, 220-3 may operate one or more order processing and/or communication systems using a computer device 222-1, 222-2, 222-3 (e.g., a mobile computing device such as a tablet computer, a smartphone or a laptop computer, as well as a desktop computer or any other type or form of computing device) and/or software applications such as a browser 224-1, 224-2, 224-3, which may be implemented through one or more computing machines that may be connected to the network 280, as indicated by lines 228-1, 228-2, 228-3, in order to transmit or receive information regarding one or more items to be made available at the marketplace 210, in the form of digital or analog data, or for any other purpose. The merchants 220-1, 220-2, 220-3 each have access to inventory 226-1, 226-2, 226-3, which may include items that may also be obtained from other sources, or items that are exclusively available through one of the merchants 220-1, 220-2, 220-3.

The merchants 220-1, 220-2, 220-3 may cause one or more items to be delivered to one or more designated facilities maintained by or on behalf of the marketplace 210, such as the fulfillment center 230, or may be instructed to deliver one or more items to the customer 270 or other destinations (not shown). Additionally, the merchants 220-1, 220-2, 220-3 may receive one or more items from other manufacturers, merchants, sellers or vendors (not shown), and may deliver one or more of such items to locations designated by the marketplace 210, e.g., the fulfillment center 230, for fulfillment and distribution to customers. Furthermore, the merchants 220-1, 220-2, 220-3 may individually or collectively perform multiple functions. For example, the merchants 220-1, 220-2, 220-3 may also be manufacturers, sellers or vendors of one or more other items, and may also offer items for purchase by customers at venues (not shown) other than the marketplace 210. Items that are made available at the marketplace 210 or ordered therefrom by customers may be made by or obtained from one or more third party sources, other than the merchants 220-1, 220-2, 220-3, or from any other sources (not shown). Moreover, the marketplace 210 itself may be, or be operated by, a manufacturer, a merchant, a seller or a vendor.

The fulfillment center 230 may be any facility that is adapted to receive, store, process and/or distribute items on behalf of the marketplace 210. As is shown in FIG. 2, the fulfillment center 230 includes a networked computer infrastructure for performing various computer-related functions associated with the receipt, storage, processing and distribution of such items, including one or more physical computer servers 232, data stores (e.g., databases) 234 and processors 236, that may be provided in the same physical location as the fulfillment center 210, or in one or more alternate or virtual locations, e.g., in a "cloud"-based environment. The fulfillment center 230 may also include stations for receiving, storing and distributing items to customers, such as one or more receiving stations 231, storage areas 233 and distribution stations 235. The fulfillment center 230 may also include any number of workers or other designated personnel tasked with performing one or more tasks within the fulfillment center 230, e.g., by handling or transporting items within the fulfillment center 230, or operating one or more pieces of equipment therein.

The fulfillment center 230 may operate one or more order processing and/or communication systems using computer devices in communication with one or more of the server 232, the data store 234 and/or the processor 236, or through one or more other computing devices or machines that may be connected to the network 280, as is indicated by line 238, in order to transmit or receive information in the form of digital or analog data, or for any other purpose. Such computer devices may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices may be general purpose devices or machines, or dedicated devices or machines that feature any form of input and/or output peripherals such as scanners, readers, keyboards, keypads, touchscreens or like devices, and may further operate or provide access to one or more engines for analyzing the information or data regarding the workflow operations, or the interactions received from the one or more operators, users or workers.

Additionally, as is discussed above, the fulfillment center 230 may include one or more receiving stations 231 featuring any apparatuses that may be required in order to receive shipments of items at the fulfillment center 230 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The fulfillment center 230 may also include one or more predefined two-dimensional or three-dimensional storage areas 233 including facilities for accommodating items and/or containers of such items, such as aisles, rows, bays, shelves, slots, bins, racks, tiers, bars, hooks, cubbies or other like storage means, or any other appropriate regions or stations. The fulfillment center 230 may further include one or more distribution stations 235 where items that have been retrieved from a designated storage area may be evaluated, prepared and packed for delivery from the fulfillment center 230 to addresses, locations or destinations specified by customers, also by way of carriers such as cars, trucks, trailers, freight cars, container ships or cargo aircraft (e.g., manned aircraft or unmanned aircraft, such as drones).

Moreover, the fulfillment center 230 may further include one or more control systems that may generate instructions for conducting operations at the fulfillment center 230, and may be in communication with one or more workers, or the various storage facilities and other components of the fulfillment center 230. Such control systems may also be associated with one or more other computing devices or machines, and may communicate with the marketplace 210, the merchants 220-1, 220-2, 220-3 or the customer 270 over the network 280, as indicated by line 238, through the sending and receiving of digital data.

The worker 250 may be any designated personnel directed to perform one or more tasks associated with the online marketplace 210 and/or the fulfillment center 230. The worker 250 may handle or transport items within the fulfillment center 230, or operate one or more pieces of equipment therein, e.g., to receive, store, process and/or distribute items within the fulfillment center 230. For example, the worker 250 may also operate one or more specific computing devices for registering the receipt, retrieval, transportation or storage of items within the fulfillment center 230, or a general purpose device such as a personal digital assistant, a digital media player, a smartphone, a handheld computer device, a tablet computer, a desktop computer or a laptop computer (not shown), which may be associated with the server 232, the data store 234 or the processor 236, or with one or more external computer devices that may be accessed via the network 280.

The worker 250 may also handle or transport items associated with one or more of the merchants 220-1, 220-2, 220-3. For example, the worker 250 may retrieve one or more items from the storage area 233 or the distribution station 235 and deliver such items to an intended destination, such as the customer 270. Additionally, the worker 250 may travel to one or more of the merchants 220-1, 220-2, 220-3 to retrieve one or more items therefrom, and travel with such items to an intended destination, such as the customer 270. Those of ordinary skill in the pertinent arts will recognize that the worker 250 may retrieve items from multiple sources and deliver such items to an intended destination, such as the customer 270. For example, referring again to FIG. 1A, the worker 150 may retrieve items from one or more of the fulfillment center 130 or the merchants 120-1, 120-2, 120-3 and deliver such items to the customer 170. Those of ordinary skill in the pertinent arts will further recognize that the worker 250 may travel by any means in accordance with his or her duties. For example, the worker 250 may travel not only on foot but also by bicycle, car, truck, boat or aircraft, or any other type or form of vehicle (e.g., a personal transporter).

The customer 270 may be any entity or individual that wishes to download, purchase, rent, lease, borrow or otherwise obtain items (e.g., goods, products, services or information of any type or form) from the marketplace 210. The customer 270 may utilize one or more computing devices, such as a smartphone 272 or any other like machine that may operate or access one or more software applications, such as a browser (not shown) or a shopping application 274, and may be connected to or otherwise communicate with the marketplace 210, the merchants 220-1, 220-2, 220-3 or the fulfillment center 230 through the network 280, as indicated by line 278, by the transmission and receipt of digital data. Moreover, the customer 270 may also receive deliveries or shipments of one or more items from facilities maintained by or on behalf of the marketplace 210, such as the fulfillment center 230, or from the merchants 220-1, 220-2, 220-3, e.g., by the worker 250.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent arts will recognize that users of such computers, servers, devices and the like may operate a keyboard, keypad, mouse, stylus, touchscreen, or other device (not shown) or method (e.g., speech recognition or gesture recognition devices or techniques) to interact with the computers, servers, devices and the like, or to "select" an item, link, node, hub or any other aspect of the present disclosure.

Those of ordinary skill in the pertinent arts will understand that process steps described herein as being performed by a "marketplace," a "merchant," a "fulfillment center," a "worker" or a "customer," or like terms, may be automated steps performed by their respective computer systems, or implemented within software modules (or computer programs) executed by one or more general purpose computers. Moreover, those of ordinary skill in the pertinent arts would recognize that references to process steps or actions described herein as being performed by or relating to a "merchant" could also be performed by or relate to a manufacturer, a seller, a vendor or another source of items. Those of ordinary skill in the pertinent arts would also recognize that process steps described as being performed by a "marketplace," a "merchant," a "fulfillment center," a "worker" or a "customer" may be typically performed by a human operator, but could, alternatively, be performed by an automated agent.

The marketplace 210, the merchants 220-1, 220-2, 220-3, the fulfillment center 230 and/or the customer 270 may use any web-enabled or Internet applications or features, or any other client-server applications or features including electronic mail (or E-mail), or other messaging techniques, to connect to the network 280 or to communicate with one another, such as through short or multimedia messaging service (SMS or MMS) text messages. For example, the server 232 may be adapted to transmit information or data in the form of synchronous or asynchronous messages from the fulfillment center 230 to the server 212, the computer device 222-1, 222-2, 222-3, the smartphone 272 or any other computer device in real time or in near-real time, or in one or more offline processes, via the network 280. Those of ordinary skill in the pertinent arts would recognize that the marketplace 210, the merchants 220-1, 220-2, 220-3, the fulfillment center 230 or the customer 270 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 212, the computer device 222-1, 222-2, 222-3, the server 232, or the smartphone 272, or any other computers or control systems utilized by the marketplace 210, the merchants 220-1, 220-2, 220-3, the fulfillment center 230 or the customer 270 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although some of the embodiments disclosed herein reference the ranking of search results in response to search queries provided to an online marketplace, e.g., a search for items relating to a keyword, or a selection of a category of items, and the display of ordered lists of information or data regarding items relating to the keyword or in the category, those of ordinary skill in the pertinent arts will recognize that the systems and methods disclosed herein are not so limited. Rather, the ranking of search results in accordance with the present disclosure may be utilized in connection with any entry of any search query to any search engine, and the resulting identification and display of search results pertaining to the search query, or the selection of any category or group, and the resulting identification or display of information or data in any category or group, in accordance with the present disclosure. Moreover, some of the embodiments disclosed herein may be used to rank lists of recommended items identified on any basis, including but not limited to the relevance of such recommended items to one or more other items selected by a user, or preferences of the user or of other, like users.

Figure 3:
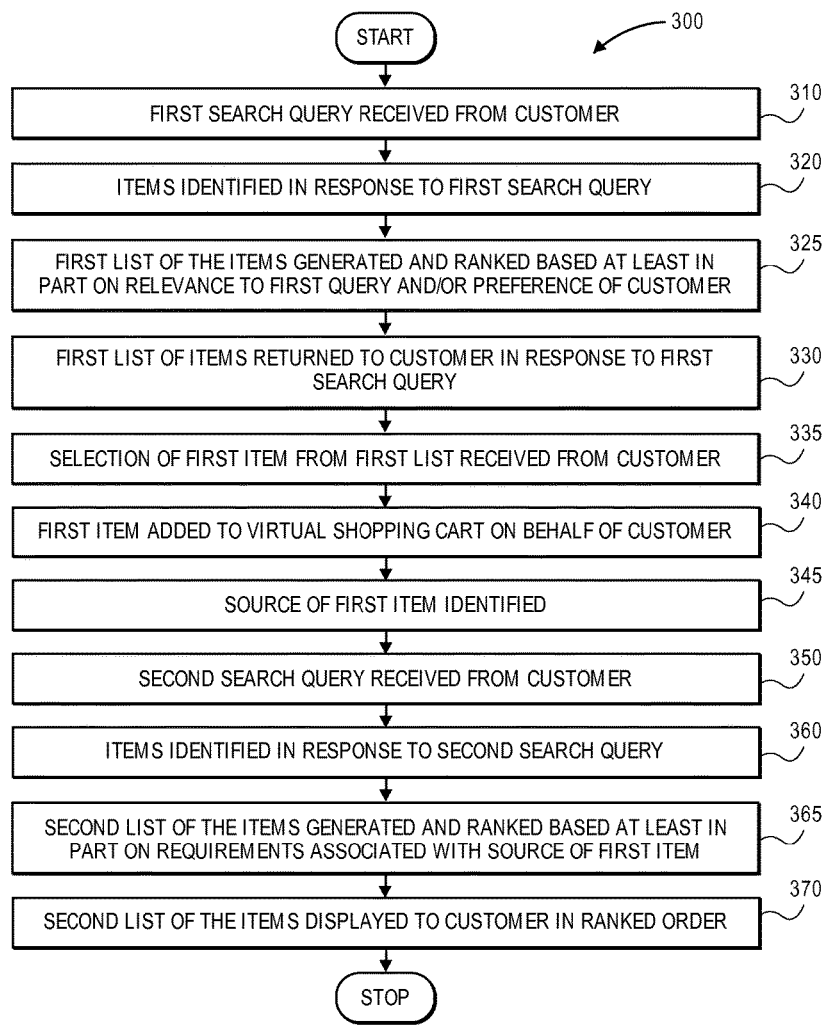
FIG. 3 is a flow chart of one process for ranking search results or recommendations in accordance with embodiments of the present disclosure.

As is discussed above, some embodiments of the present disclosure are directed to receiving search queries or selections of categories from users, obtaining and displaying search results based on such queries or categories, receiving selections of one or more of the search results from users, receiving further search queries or selections of categories from users, obtaining further search results in response to such search queries or categories, and displaying information associated with the search results with in a preferentially ranked order corresponding to extrinsic factors, such as requirements associated with respective sources or entities associated with the search results. Referring to FIG. 3, a flow chart 300 representing one process for ranking search results or recommendations in accordance with embodiments of the present disclosure is shown.

At box 310, a first search query is received from a customer. The first search query may include one or more keywords pertaining to items available from an online marketplace. Alternatively, the customer may select a first category, e.g., from a list of hyperlinked elements or a drop-down menu. At box 320, a plurality of items is identified in response to the first search query. The items may relate directly to the one or more keywords of the first search query or to one or more synonyms or related terms associated with such keywords. Alternatively, the items may be in the first category selected by the customer.

At box 325, a first list of the items identified at box 320 may be generated and ranked based at least in part on their relevance to the first search query, or a preference of the customer, and at box 330, the first list of items is returned to the customer in response to the first search query. For example, where the customer enters a keyword of "fishing rods" at an online marketplace, and a plurality of items relating to "fishing rods" is identified (e.g., not only fishing rods but also reels, tackle boxes, bait or other fishing accessories) by the online marketplace, the items may be ranked based on their association or relation to the keyword "fishing rods" (e.g., with more popular fishing rods ranked first, followed by less popular fishing rods, as well as fishing rod accessories such as replacement reels, fishing line, hooks and the like), or on the preferences of the customer (e.g., where the customer is known to prefer certain brands, colors, makes or models of fishing rods or of other items, fishing rods or accessories having such brands, colors, makes or models may be ranked above fishing rods or accessories of other brands, colors, makes or models) or preferences of like customers (e.g., other customers who have purchased the same items, or similar items, as the customer), or a combination of the association or relation of the items to the keywords and the preferences of the customer or of like customers.

At box 335, a selection of a first item in the first list is received from the customer, and at box 340, the first item is added to a virtual shopping cart on behalf of the customer. For example, referring again to FIGS. 1C and 1D, a selection of the search result 125B-2 displayed on the smartphone 172 shown in FIG. 1C results in an addition of an item associated with the search result 125B-2 (viz., bacon, 16 oz., thin cut) to the virtual shopping cart of the customer. At box 345, a source of the first item is identified. The source of the first item may be a fulfillment center operated by an online marketplace, or a manufacturer, a merchant, a seller or a vendor, or any other source that may own, control, possess or have access to one or more of the first item.

At box 350, a second search query is received from the customer. The second search query may include a different keyword, or the same keyword, that was included in the first search query. Alternatively, a selection of a second category may be received from the customer. At box 360, a plurality of items is identified in response to the second search query. The items may relate directly to one or more keywords included in the second search query, or to one or more synonyms or related terms associated with such keywords. Alternatively, the items may be in the second category selected by the customer.

At box 365, a second list of the items identified at box 360 may be generated and ranked based at least in part on one or more requirements associated with the source of the first item. Where the source of the first item is a merchant having a predetermined minimum price or volume threshold associated with the sale of items at the online marketplace, the threshold may serve as a basis for ranking the second list of items. For example, where the merchant will levy a surcharge or other fee on orders below a predetermined threshold, the second list of items will rank items from the merchant having prices which, if selected, will cause the total value of the order to exceed the predetermined threshold above other items from the merchant, or items from other merchants. Alternatively, where none of the items identified at box 360 would, if selected, cause the total value of the order to exceed the predetermined threshold, the items from the merchant having prices which would cause the total value of the order to most closely approach the predetermined threshold are ranked above other items from the merchant or items from other merchants. For example, the items may be ranked based first on their relevance to a query or a previously selected item, or on a preference of the customer (e.g., a preferred brand), and next on whether the items are provided by a merchant from which the customer has already selected another item, as well as the prices of the respective items (e.g., a lowest cost item that would exceed a relevant requirement of a merchant, or how closely the total value of the order will approach the predetermined threshold if an item is selected), or on any other relevant basis. At box 370, the second list of the items is displayed to the customer in the ranked order, and the process ends.

Accordingly, the systems and methods of the present disclosure may consider external factors, such as requirements set by sources of items previously selected by a user, when ranking items in response to a search query or a selection of a category, and displaying the items to the user. Such external factors may be the primary basis for ranking the items, or, alternatively, may augment systems and methods for ranking items according to other factors, including but not limited to the relevance of the items to a search query, or the preferences of a customer who provided the search query, or like customers.

Figure 4A:
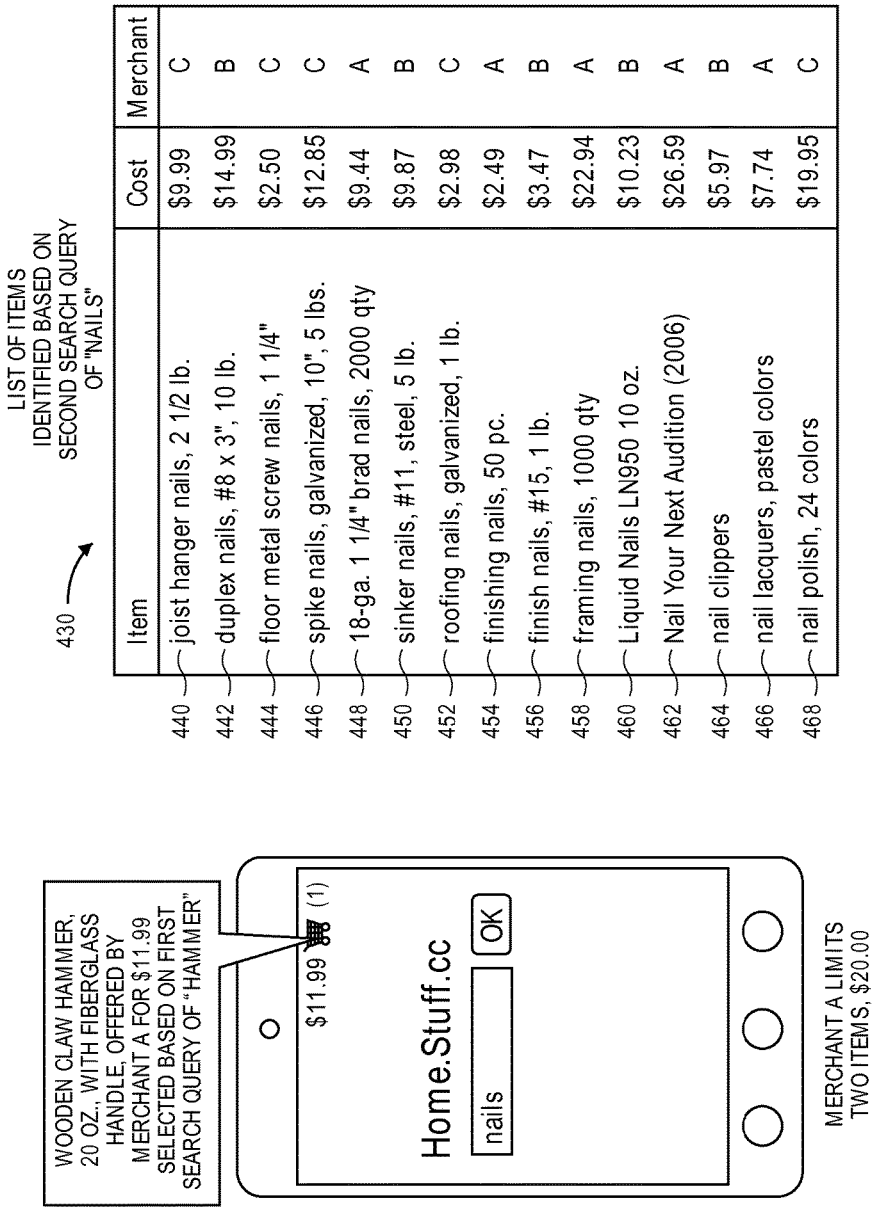

Referring to FIGS. 4A and 4B, one example of the preferential ranking of items in response to a search query received from a customer based on requirements established by a source of one or more other items selected by the customer is shown. As is shown in FIG. 4A, the customer provided a first search query of "hammer" to a search engine, and selected a twenty-ounce wooden claw hammer having a fiberglass handle offered by a merchant (viz., Merchant A) at a price of $11.99 for addition to a virtual shopping cart. As is shown in FIG. 4A, the merchant has a predetermined set of limits, including a minimum number of items to be purchased (viz., two), and a minimum order price (viz., twenty dollars, or $20).

Subsequently, after selecting the item in response to the first search query, the customer enters a second search query of "nails" at the search engine. As is shown in FIG. 4A, a raw list 430 of items 440, 442, 444, 446, 448, 450, 452, 454, 456, 458, 460, 462, 464, 466, 468 is identified based on the second search query 420. The list 430 includes items from a variety of merchants (viz., Merchant A, Merchant B and Merchant C) that are available at prices ranging from $2.49 to $26.59, and the items are ranked based on their relation to the second search query 420, or the word "nails," and to the item (viz., the twenty-ounce wooden claw hammer having a fiberglass handle) previously selected by the customer. For example, items 440, 442, 444, 446, 448, 450, 452, 454, 456, 458 are actual nails of varying types (e.g., hanger nails, duplex nails, floor nails, spike nails, brad nails, sinker nails, roofing nails, finishing nails or framing nails) that may be physically struck by the item previously selected by the customer. Additionally, item 460 is a liquid adhesive substitute for a nail, while item 462 is a book which includes the word "nail" in its title, and items 464, 466, 468 relate to providing care to nails, e.g., the hardened protein coverings of tips of human fingers or toes.

As is discussed above, in accordance with the present disclosure, lists of items identified at the request of a customer, such as the list 430, may be preferentially ranked based not only on their relevance to a search query provided by a customer, or to the preferences of the customer or like customers, but also on their relationship with a source of an item previously selected by the customer, such as the item previously selected by the customer, or with regard to one or more other extrinsic factors. Referring to FIG. 4B, a preferentially ranked list 435 of the items 440, 442, 444, 446, 448, 450, 452, 454, 456, 458, 460, 462, 464, 466, 468 included in the raw list 430 of FIG. 4A is shown.

As is shown in FIG. 4B, the five items 448, 458, 462, 466, 454 that are also offered for sale by the merchant are ranked highest in the list 435. For example, in order to satisfy the limits defined by the merchant that offered the item previously selected by the customer, viz., Merchant A, the customer will have to select one or more items from the merchant having an aggregate value of at least $8.01, or a difference between the price of the item previously selected by the customer and the twenty dollar minimum price limit for the merchant. Accordingly, items 448, 458, 462, each of which has a price above $8.01, are shown as ranking highly in the list 435. Item 448 is ranked above item 458 and item 462 because selecting item 448 would enable the customer to exceed the twenty dollar minimum price limit for the merchant at the lowest cost. Moreover, items 448, 458 are ranked above item 462 because the items 448, 458 are complementary to the item previously selected by the customer (e.g., the items 448, 458 may be used in connection with the item previously selected by the customer), while the item 462 is entirely unrelated to the item previously selected by the customer.

Likewise, items 466, 454 are also offered for sale by the merchant, but have prices that are below $8.01. As is shown in FIG. 4B, item 466 is ranked above item 454, despite the fact that item 454 is a complement to the item previously selected by the customer and item 466 is not a complement to the item previously selected by the customer, because the price of item 466 is closest to the $8.01 difference between the price of the item previously selected by the customer and the twenty dollar minimum price limit for the merchant. Following the items 448, 458, 462, 466, 454 in the list 435 are items 446, 442, 450, 452, 444, 456, 460, 440, 464, 468, which are offered by merchants other than the merchant, and would thus not, if selected, aid in meeting or exceeding the twenty dollar minimum price limit for the merchant.

Figure 5:
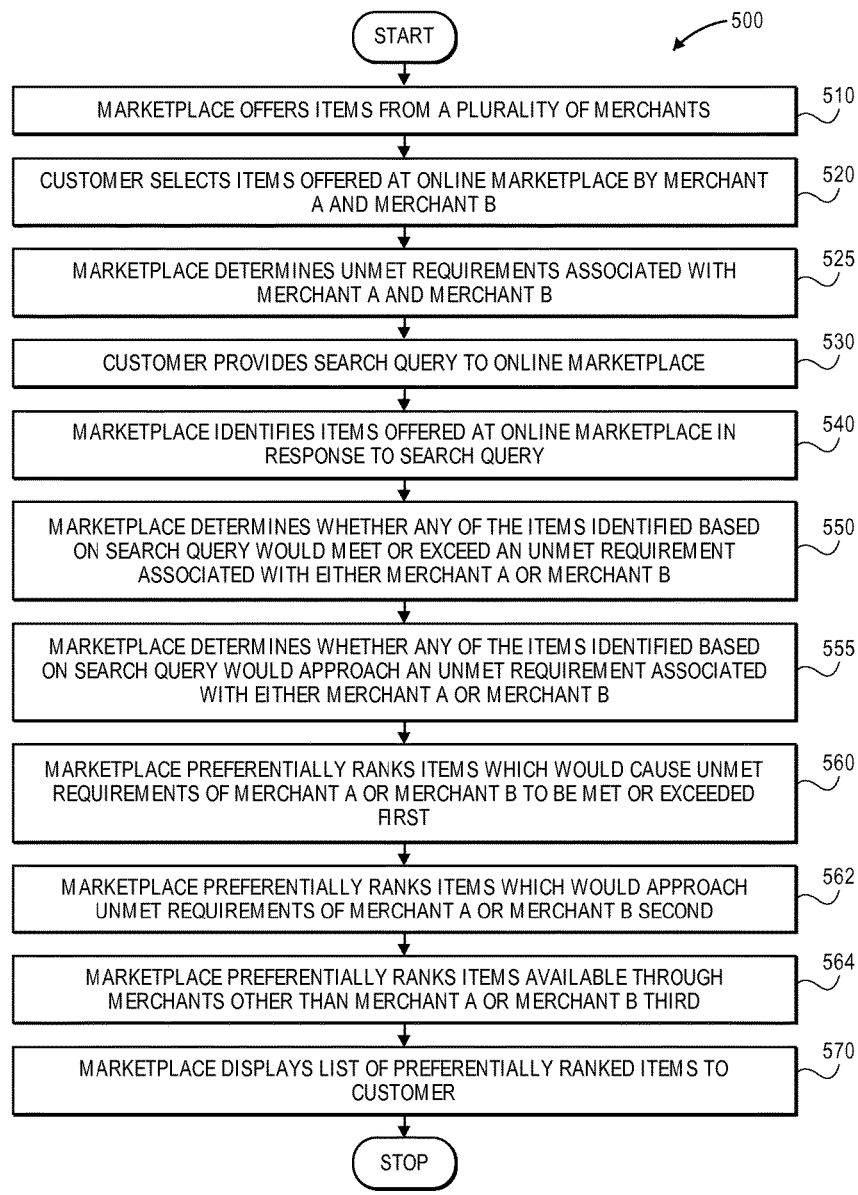
FIG. 5 is a flow chart of one process for ranking search results or recommendations in accordance with embodiments of the present disclosure.

As is discussed above, the systems and methods of the present disclosure may be used to rank search results with regard to any extrinsic factors, including whether selections of such search results would meet or exceed, or even approach, a previously determined requirement, including two or more requirements that are independently set. Referring to FIG. 5, a flow chart 500 representing one process for ranking search results or recommendations in accordance with embodiments of the present disclosure is shown.

At box 510, a marketplace offers items from a plurality of merchants to customers, e.g., via one or more web pages accessible to or applications operable on one or more computing devices. At box 520, a customer selects items that are offered at the marketplace by two merchants, Merchant A and Merchant B, each of which may be any entity that owns, controls, possesses or has access to such items. At box 525, the marketplace determines that there are unmet requirements of each of Merchant A and Merchant B, e.g., that the customer has yet to satisfy a minimum price threshold, a minimum number of items, or any other limit, restriction, constraint, prerequisite or other requirement established by Merchant A and Merchant B.

At box 530, the customer provides a search query to the online marketplace, e.g., by entering a keyword into a text box provided at a web site or shopping application, or by selecting a keyword corresponding to a category, and at box 540, the marketplace identifies items that are offered at the online marketplace in response to the search query. The items may be identified based on their relationship with the search query, based on one or more preferences of the customer or like customers, or on any other factor.

At box 550, the marketplace determines whether any of the items identified at box 540 would meet or exceed an unmet requirement associated with either Merchant A or Merchant B. For example, where a merchant assesses a surcharge or other fee when an aggregate cost of the items ordered by the customer is less than a predetermined minimum cost, the marketplace will determine whether any the items identified in response to the search query are offered by the merchant and, if so, the costs of such items. The number of the items offered by the merchant which would, if selected by the customer, cause the aggregate cost to exceed the predetermined minimum cost may be determined. At box 555, the marketplace determines whether any of the items identified based on the search query would approach an unmet requirement associated with either Merchant A or Merchant B. The number of the items offered by the merchant which would not individually, if selected by the customer, exceed the predetermined minimum cost may be determined.

At box 560, the marketplace preferentially ranks the items that would cause the unmet requirements of either Merchant A or Merchant B to be met or exceeded first. For example, for any items identified at box 550, e.g., items identified in response to the search query offered by the merchant which would, if selected by the customer, cause an aggregate cost of the items ordered by the customer to exceed a minimum price threshold set by the merchant, such items may be ranked highest among all of the items identified at box 540. At box 562, the marketplace preferentially ranks the items that would approach one or more of the unmet requirements of either Merchant A or Merchant B second. For example, for any items identified in response to the search query offered by the merchant which would approach, but not meet or exceed, the minimum price threshold set by the merchant, such items may be ranked next-highest, e.g., immediately following the items which would meet or exceed the minimum price threshold set by the merchant, among all of the items identified at box 540.

At box 564, the marketplace ranks the items identified in response to the search query that are offered by merchants other than Merchant A or Merchant B are preferentially ranked next, e.g., immediately following the items which would approach the minimum price threshold set by the merchant, among all of the items identified at box 540. For example, in order to encourage customers to purchase items which would meet or exceed, or approach, a relevant threshold established by a merchant from which the customers have already selected items, the marketplace may rank such items higher, even if the items may be identified at lower costs from other merchants, or if other items that are more closely related to the search query have been identified. At box 570, the marketplace displays a list of the preferentially ranked items to the customer, e.g., with the items identified at box 560 ranked first, followed by the items identified at box 562, and the items identified at box 564, and the process ends.

Figure 6A:
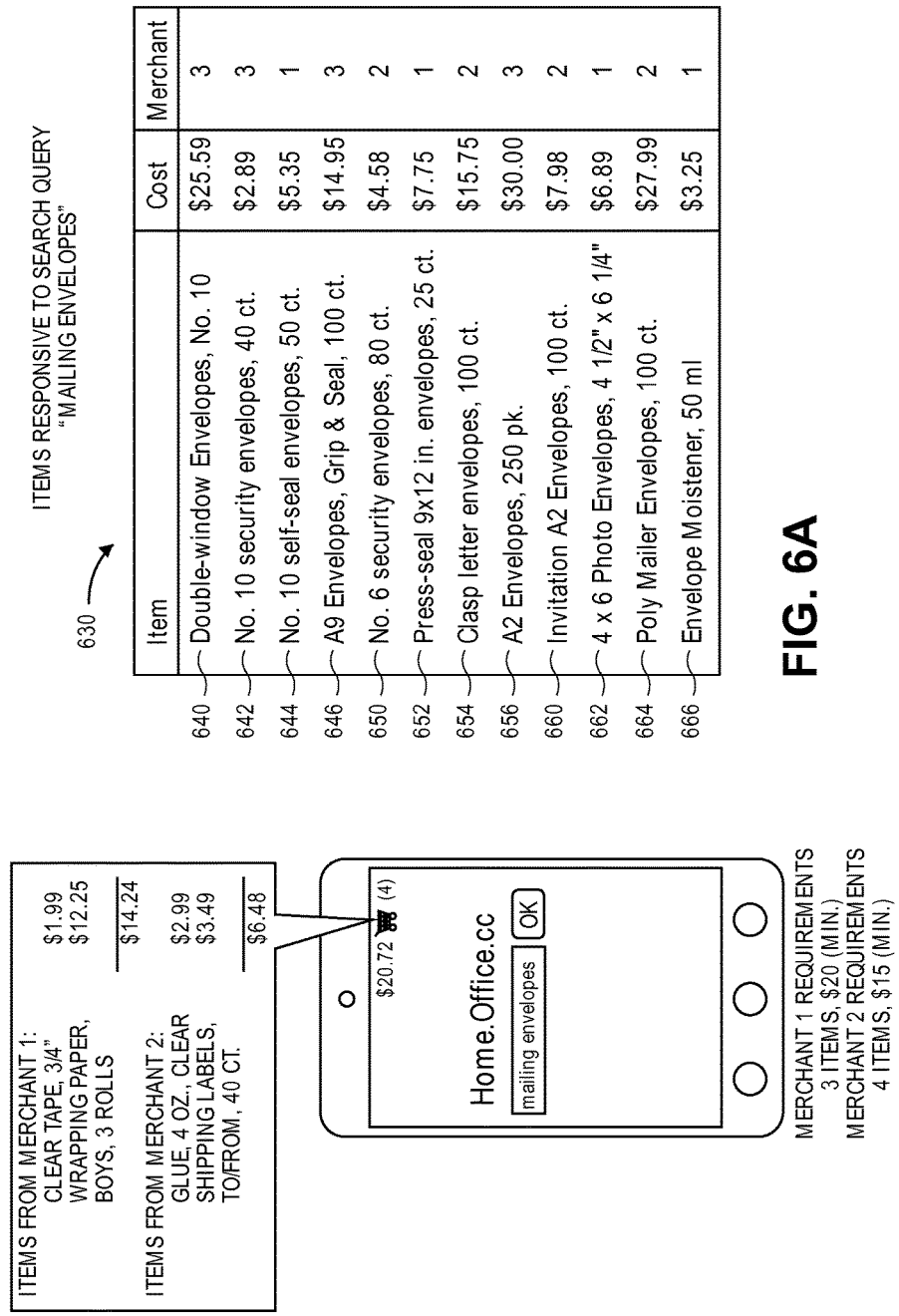
FIGS. 6A and 6B are views of aspects of one system for ranking search results or recommendations in accordance with embodiments of the present disclosure.
Figure 6B:
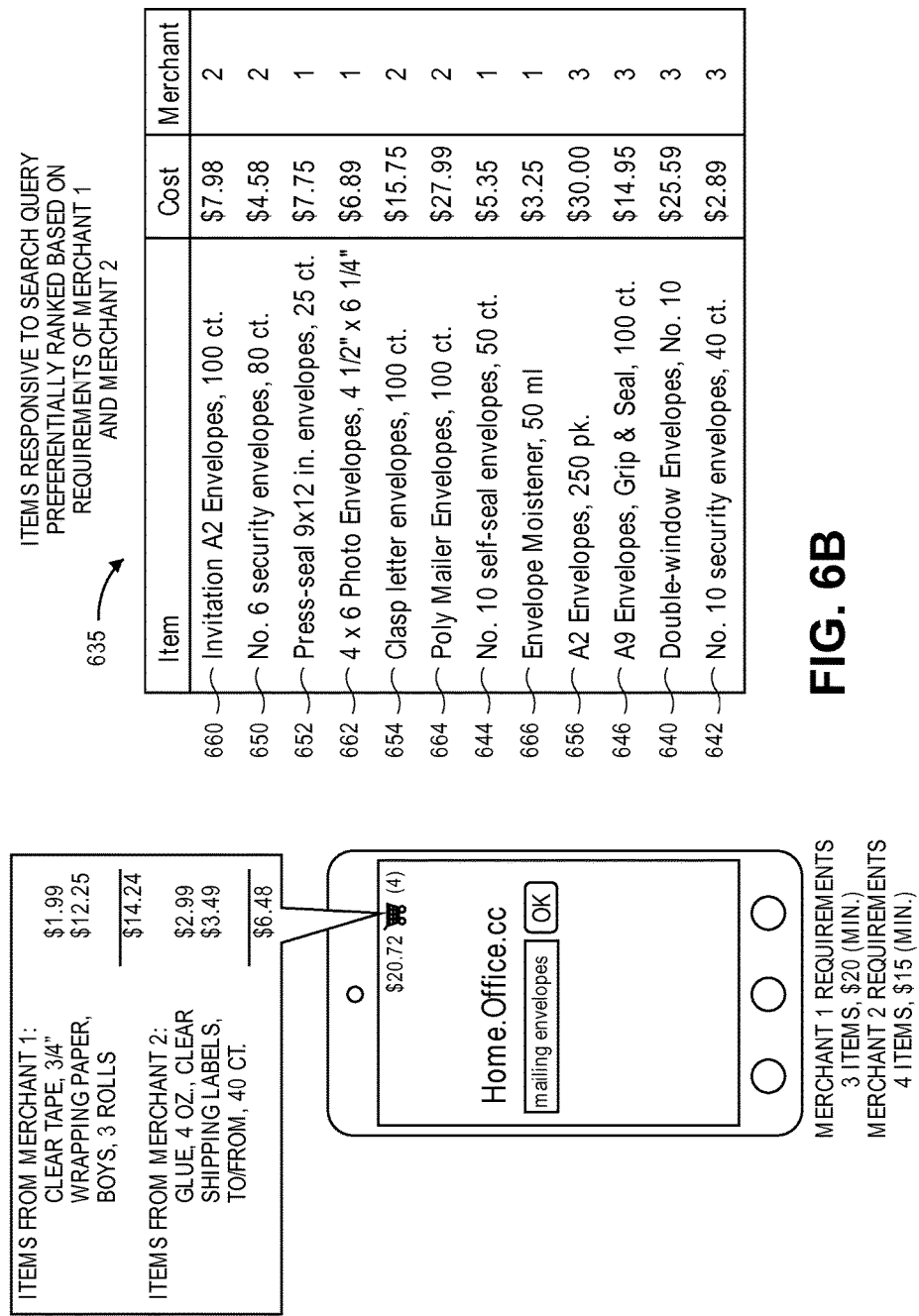

Referring to FIGS. 6A and 6B, another example of the preferential ranking of items in response to a search query received from a customer based on requirements established by a source of one or more other items selected by the customer is shown. As is shown in FIG. 6A, a customer has selected items from two merchants (viz., Merchant 1 and Merchant 2), including three-quarter inch wide clear tape valued at $1.99 and three rolls of wrapping paper for boys' gifts valued at $12.25, or a total value of $14.24, from Merchant 1, and four ounces of clear glue valued at $2.99 and forty to/from shipping labels valued at $3.49, or a total value of $6.48, from Merchant 2. Additionally, Merchant 1 has imposed a requirement that customers must purchase a minimum of three items totaling at least twenty dollars ($20) in value, while Merchant 2 has imposed a requirement that customers must purchase a minimum of four items totaling at least fifteen dollars ($15) in value. Thus, as is shown in FIG. 6A, the systems and methods of the present disclosure may effectively open and track different virtual shopping carts for Merchant 1 and Merchant 2, each of which may be subject to different requirements respectively imposed by Merchant 1 or Merchant 2, and monitor the addition of items to or the removal of items from the virtual shopping carts, as well as whether an item would, if added to one of the virtual shopping carts, satisfy a requirement imposed by one of the merchants.

As is also shown in FIG. 6A, after having selected the items from Merchant 1 and Merchant 2, and added such items to a virtual shopping cart, the customer has provided a search query (viz., "mailing envelope") to the online marketplace, and a raw list 630 of items 640, 642, 644, 646, 650, 652, 654, 656, 660, 662, 664, 666 is identified based on the search query. The list 630 includes items offered by a plurality of merchants (viz., Merchant 1, Merchant 2 and Merchant 3), and the items are ranked based on their relation to the search query, and to the items previously selected by the customer.

As is discussed above, in accordance with the present disclosure, lists of items identified at the request of a customer, such as the list 630, may be preferentially ranked based on not only their relevance to a search query provided by a customer, or to the preferences of the customer or like customers, but also their relationship with sources of items previously selected by the customer, such as Merchant 1 and Merchant 2, or with regard to one or more other extrinsic factors. Referring to FIG. 6B, a preferentially ranked list 635 of the items 640, 642, 644, 646, 650, 652, 654, 656, 660, 662, 664, 666 included in the raw list 630 of FIG. 6A is shown.

As is shown in FIG. 6B, the eight items 660, 650, 652, 662, 654, 664, 644, 666 that are also offered for sale by the merchants from which the customer has previously selected items, or Merchant 1 and Merchant 2, are ranked highest in the list 635. In particular, because the customer must select at least two items offered by Merchant 2 having an aggregate value of at least $8.52, viz., a difference between the prices of the clear glue and the shipping labels selected from Merchant 2, and the fifteen dollar minimum price, in order to satisfy the requirements imposed by Merchant 2, the two items 660, 650 offered by Merchant 2 which would satisfy the requirements at the lowest aggregate cost, viz., $12.56, are ranked highest in the list 635. Next, because the customer must select at least one item offered by Merchant 1 having an aggregate value of at least $5.76, viz., a difference between the prices of the clear tape and the wrapping paper and the twenty dollar minimum price, in order to satisfy the requirement imposed by Merchant 1, the two items 652, 662 which would satisfy the requirement are ranked next, behind the items 660, 650.

Thereafter, two items 654, 664 that are offered by Merchant 2 and would, if selected, exceed the requirements imposed by Merchant 2, but at a substantial cost, are shown next in the list 635. Additionally, items 644, 666, which are offered by Merchant 1, but which would not, if selected, satisfy the requirements imposed by Merchant 1, are shown next in the list 635. Finally, items 656, 646, 640, 642, which are offered by Merchant 3 and cannot, therefore, assist in satisfying either of the requirements imposed by Merchant 1 or Merchant 2, are shown at the end of the list 635.

Accordingly, the systems and methods may preferentially display, in response to a search query, items offered by a merchant which relate to the search query and would cause an order to meet or exceed one or more requirements established by the merchant that were previously selected by a customer, or would cause the order to approach the one or more requirements, above items offered by other merchants. In this regard, a customer viewing the items displayed in response to the search query may be more likely to select one or more of the items that would cause the order to meet or exceed, or approach, the one or more requirements established by the merchant.

Additionally, although the items 448, 458, 462, 466, 454 shown in the list 435 of FIG. 4B or the items 660, 650, 652, 662, 654, 664, 644, 666 shown in the list 635 of FIG. 6B are preferentially displayed to the customer by virtue of their position in such lists 435, 635, those of ordinary skill in the pertinent arts will recognize that items which, if selected, would cause an order to meet or exceed, or approach, one or more requirements of a merchant may be emphasized in any manner in accordance with the present disclosure. For example, such items may be shown in bold face, distinct colors or fonts of different (e.g., larger) sizes, while items which would neither cause the order to meet or exceed nor cause the order to approach the one or more requirements of a merchant may be shown in standard face, nondescript colors or normal or traditional (e.g., normal or smaller) sizes. One or more particular search results may be emphasized or deemphasized, as necessary, with respect to one or more other search results in accordance with the present disclosure. Where items are preferentially displayed with different fonts, colors, sizes or other emphases, the orders of the lists of items identified in response to a search query or the lists of recommended items, e.g., the lists 430, 630 of FIGS. 4A and 6A, may also be adjusted, but need not be adjusted.

Additionally, those of ordinary skill in the pertinent arts will recognize that some embodiments of the systems and methods disclosed herein may preferentially display not only search results or recommendations which, if selected, would meet or exceed a requirement imposed by a source of one or more items previously selected by a user but also search results or recommendations for which all relevant requirements imposed by sources of such items have already been met or exceeded. In this regard, the systems and methods disclosed herein may, by virtue of the manner in which such items are displayed, encourage a customer to not only meet or exceed such requirements but also avoid exposing himself or herself to additional requirements by the selection of items provided by other sources.

Figure 7:
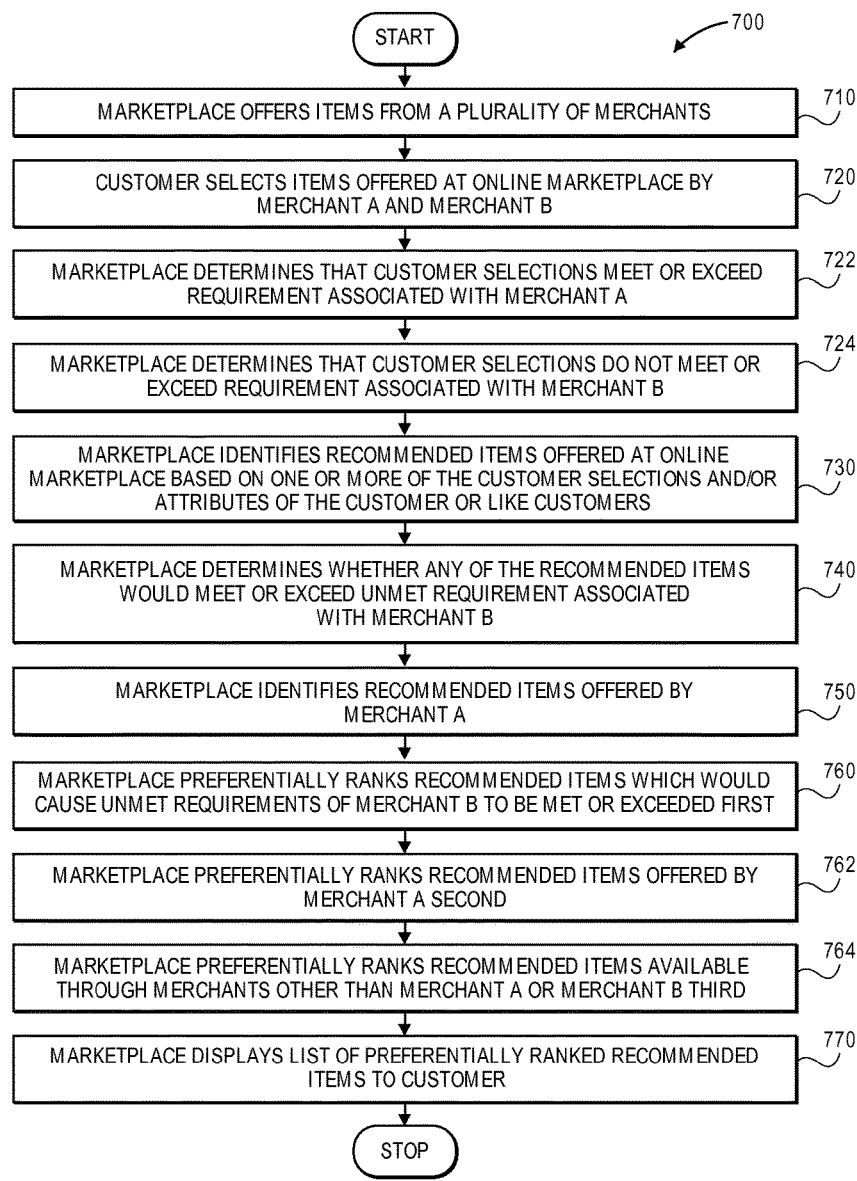
FIG. 7 is a flow chart of one process for ranking search results or recommendations in accordance with embodiments of the present disclosure.

Referring to FIG. 7, a flow chart 700 representing one process for ranking search results or recommendations in accordance with embodiments of the present disclosure is shown. At box 710, a marketplace offers items from a plurality of merchants to customers, e.g., via one or more web pages accessible to or applications operable on one or more computing devices. At box 720, a customer selects items that are offered at the marketplace by two merchants, Merchant A and Merchant B, each of which may be any entity that owns, controls, possesses or has access to such items. At box 722, the marketplace determines that the customer selections meet or exceed requirements associated with Merchant A, while at box 724, the marketplace determines that the customer selections do not meet or exceed requirements associated with Merchant B. For example, the items selected at box 720 that are offered by Merchant A may exceed a minimum number or price threshold set forth by Merchant A, while the items selected at box 720 that are offered by Merchant B may fall short of a minimum number or price threshold set forth by Merchant B.

At box 730, the marketplace identifies recommended items that are offered at the online marketplace based on one or more of the customer selections and/or attributes of the customer or of like customers. The items may be identified based on their relationship with items selected by the customer, or items previously purchased by the customer, on one or more preferences of the customer or like customers, or on any other factor.

At box 740, the marketplace determines whether any of the recommended items identified at box 730 would meet or exceed the unmet requirements of Merchant B. For example, where the customer has previously selected items provided by a merchant which have an aggregate cost of $50, and the merchant has imposed a minimum order limit of $75 that must be met or exceeded in order to avoid a surcharge or other fee, the marketplace determines whether any of the recommended items are offered by the merchant that imposed the $75 minimum order limit and have a minimum cost of $25, such that a selection of one or more of the recommended items would cause the minimum order limit to be exceeded. At box 750, the marketplace identifies recommended items offered by Merchant A, e.g., the merchant for which the requirements were determined to have been met at box 722.

At box 760, the marketplace preferentially ranks the recommended items that would cause the unmet requirements of Merchant B to be met or exceeded first. For example, any recommended items offered by Merchant B which would, if selected by the customer, cause an aggregate cost of the items ordered by the customer from Merchant B to exceed a minimum price threshold set by Merchant B may be ranked highest among all of the recommended items identified at box 730. At box 762, the marketplace preferentially ranks any recommended items offered by Merchant A second. For example, any recommended items identified at box 730 that were offered by Merchant A, for which the requirements were determined to have been met at box 722, may be ranked next-highest, e.g., immediately following the recommended items which would meet or exceed the requirements of Merchant B, among all of the recommended items identified at box 730.

At box 764, the marketplace preferentially ranks the recommended items identified at box 730 that are offered by merchants other than Merchant A or Merchant B next, e.g., immediately following the recommended items offered by Merchant A, among all of the recommended items identified at box 730. For example, in order to encourage customers to purchase items which would meet or exceed, or approach, the requirements established by Merchant B, and to also encourage such customers to avoid being subjected to requirements of other merchants, the marketplace may rank recommended items offered by Merchant A and Merchant B higher than recommended items offered by other merchants, even if the recommended items offered by Merchant A and Merchant B may be identified at lower costs from other merchants, or if other recommended items are more closely related to the items previously selected or purchased by the customer, or to one or more attributes of the customer or like customers. At box 770, the marketplace displays a list of the preferentially ranked recommended items to the customer, e.g., with the recommended items identified at box 760 ranked first, followed by the recommended items identified at box 762, and the recommended items identified at box 764, and the process ends.

Those of ordinary skill in the pertinent arts will further recognize that some embodiments of the systems and methods disclosed herein may also evaluate the contents of a customer's virtual shopping cart at an online marketplace on an ongoing basis, with respect to requirements imposed by merchants who made such items available at the online marketplace. For example, where a customer selects one item that is made available by one merchant, and then selects another item that is made available by another merchant, the customer may be prompted to purchase both of the items from the same merchant, if that merchant has access to both of the items, and if purchasing both of the items together from that merchant would satisfy one or more requirements imposed by that merchant.

Figure 8:
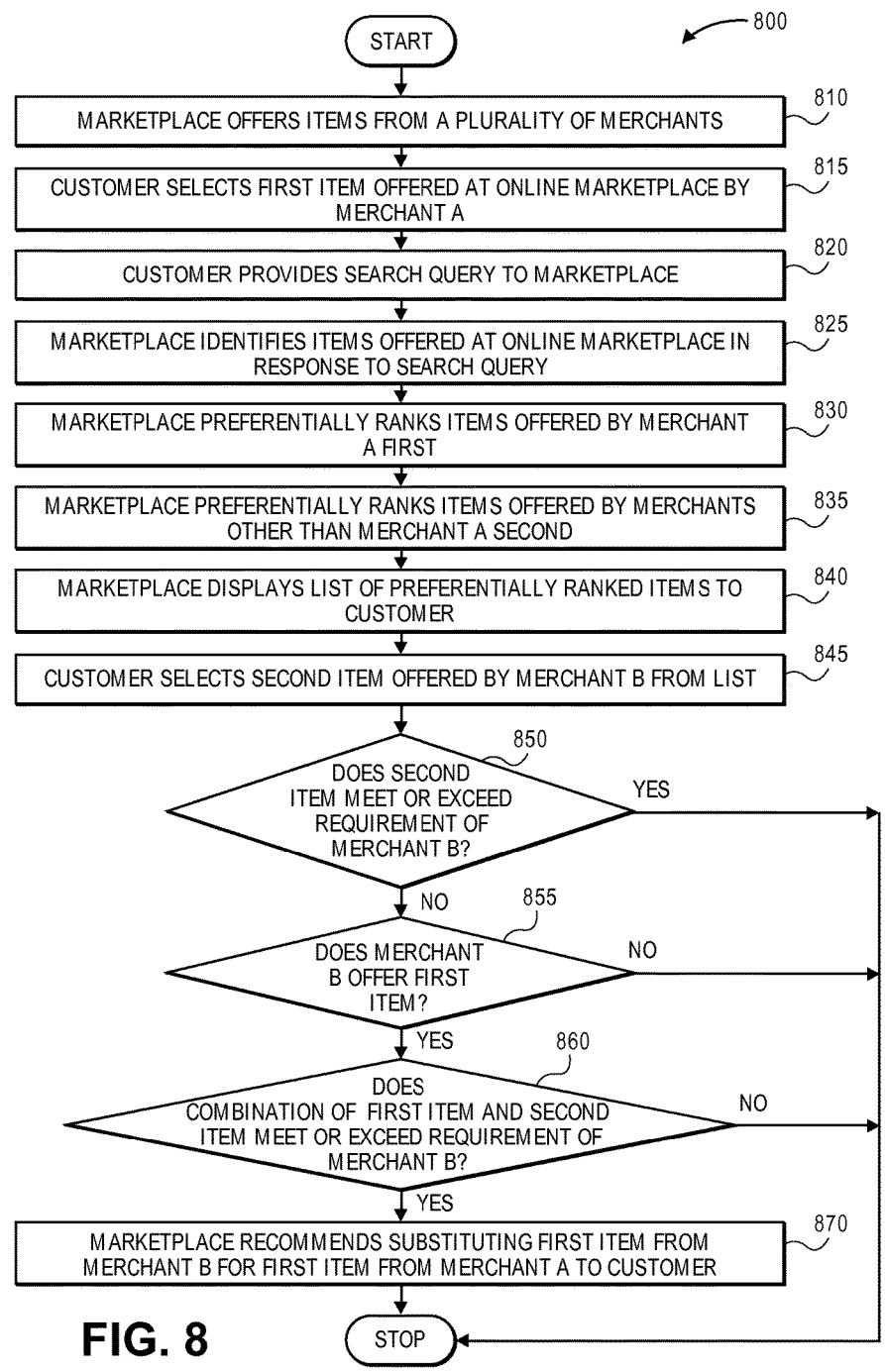
FIG. 8 is a flow chart of one process for ranking search results or recommendations in accordance with embodiments of the present disclosure.

Referring to FIG. 8, a flow chart 800 representing one process for ranking search results or recommendations in accordance with embodiments of the present disclosure is shown. At box 810, a marketplace offers items from a plurality of merchants to customers, e.g., via one or more web pages accessible to or applications operable on one or more computing devices. At box 815, a customer selects a first item offered at the marketplace by Merchant A. At box 820, the customer provides a search query to the marketplace, and at box 825, the marketplace identifies items that are offered at the marketplace in response to the search query. For example, the items identified in response to the search query may relate directly to the search query, and indirectly to the customer or to one or more other items selected by the customer.

At box 830, the marketplace preferentially ranks items offered by Merchant A that were identified in response to the query first, and at box 835, the marketplace preferentially ranks items that were offered by merchants other than Merchant A next. For example, as is discussed above, preferentially ranking items that are offered by merchants from whom the customer has already selected one or more items may encourage the customer to meet or exceed, or approach, requirements that have not been met, or to remain above such requirements, while avoiding subjecting the customer to one or more other requirements that may be imposed by other merchants.

At box 840, the marketplace displays a list of the preferentially ranked items to the customer, and at box 845, the customer selects a second item offered by a Merchant B from the list of the preferentially ranked items. Subsequently, the marketplace determines, at box 850, whether the second item meets or exceeds a requirement of Merchant B. For example, if Merchant B has imposed a minimum cost threshold that must be met in order to purchase items from Merchant B via the online marketplace, or to avoid paying a surcharge on such a purchase, whether the price of the second item exceeds the minimum cost threshold may be determined. If the price of the second item exceeds the minimum cost threshold, then the process ends.

If the price of the second item does not exceed the minimum cost threshold, then the process advances to box 855, where it is determined whether Merchant B also offers the first item selected at box 815. If Merchant B does not offer the first item, then the process ends. If Merchant B does offer the first item, however, then the process advances to box 860, where it is determined whether a combination of the first item and the second item would, if purchased together from Merchant B, exceed the requirement of Merchant B. If the combination of the first item and the second item would not meet or exceed the requirement of Merchant B, then the process ends.

If, however, the combination of the first item and the second item would exceed the requirement of Merchant B, e.g., if the aggregate cost of the first item and the second item exceeds a minimum cost threshold imposed by Merchant B, then the process advances to box 870, where the marketplace recommends substituting a first item from Merchant B for the first item from Merchant A that was selected at box 815, and the process ends. For example, where purchasing the first item and the second item together from Merchant B would satisfy the requirement imposed by Merchant B, then a window, a box or a prompt may be displayed to the customer. The recommendation may identify any relevant information regarding the first item, or a substitute for the first item, that may be obtained from Merchant B. For example, where the first item selected as offered by Merchant A is a package of single-cell 1.5 volt AA batteries, the same package of batteries, or a fungible or equivalent package of batteries (e.g., AA batteries obtained by Merchant B from a different manufacturer or other source) may be recommended to the customer for purchase from Merchant B.

Alternatively, those of ordinary skill in the pertinent arts will recognize that the determinations of whether attributes of the second item satisfy the requirements of Merchant B, whether Merchant B offers the first item, and whether the combination of the first item and the second item would, if purchased together from Merchant B, satisfy the requirements of Merchant B at boxes 855, 860 and 870 may also be made with regard to Merchant A. For example, upon the selection of the second item offered by Merchant B at box 845, some embodiments of the present disclosure may determine whether the second item is also offered by Merchant A, and whether the combination of the first item and the second item would, if purchased together from Merchant A, satisfy the requirements of Merchant A.

A recommendation to substitute one item offered by one merchant for another item offered by a different merchant in order to satisfy a requirement imposed by one or more of the merchants may be made in any manner. Referring to FIGS. 9A through 9E, views of one system for ranking search results or recommendations in accordance with embodiments of the present disclosure are shown. Except where otherwise noted, reference numerals preceded by the number "9" shown in FIGS. 9A through 9E indicate components or features that are similar to components or features having reference numerals preceded by the number "2" shown in FIG. 2, or by the number "1" shown in FIGS. 1A through 1E.

Figures 9A, 9B:
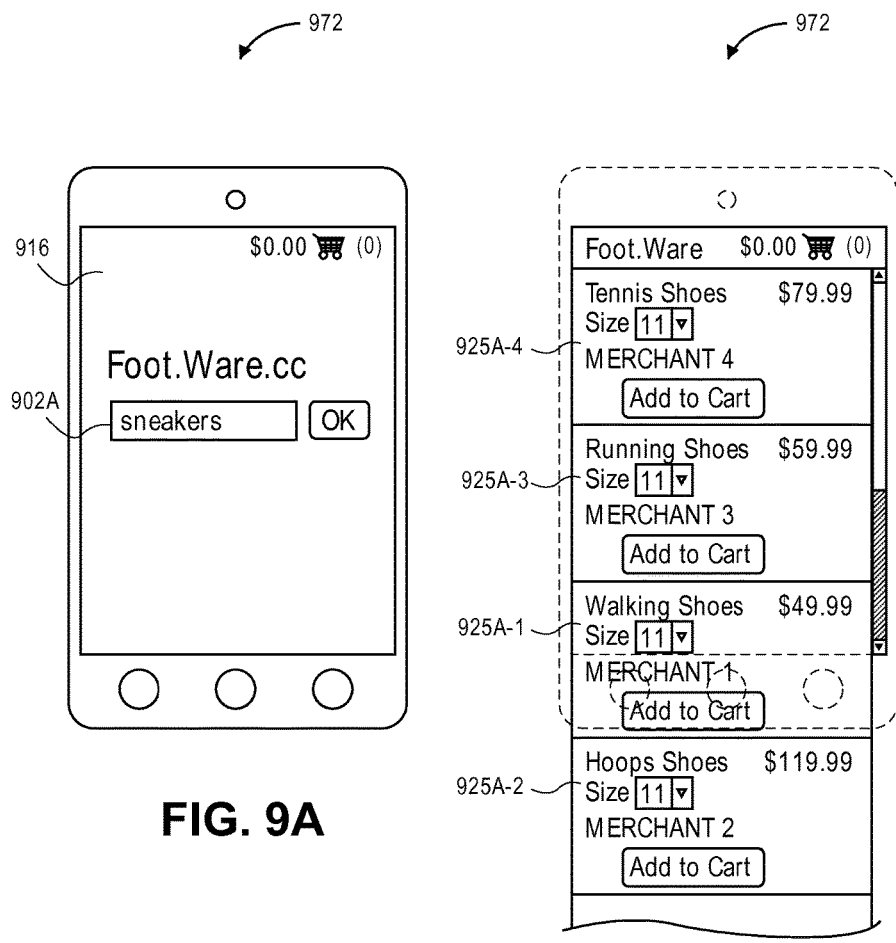
FIGS. 9A through 9E are views of aspects of one system for ranking search results or recommendations in accordance with embodiments of the present disclosure.

As is shown in FIG. 9A, a customer may place an order for a plurality of items via a web page 916 (or shopping application) associated with an online marketplace (not shown) using a smartphone 972 or other networked computer device. As is shown in FIG. 9A, the customer may provide a search query 902A (viz., "sneakers") to the web page 916, and the search query 902A may be provided from the smartphone 972 to the online marketplace (not shown) via one or more wired or wireless connections to a network, such as the Internet. As is shown in FIG. 9B, upon receiving the search query 902A, the online marketplace may return a list of items 925A-4, 925A-3, 925A-1, 925A-2 identifying items which pertain to the search query 902A that are available via the online marketplace from one or more merchants (not shown), and a list of the items 925A-4, 925A-3, 925A-1, 925A-2 may be displayed on the smartphone 972. The items 925A-4, 925A-3, 925A-1, 925A-2 are typically ranked based on their respective relevance to the search query 902A, a preference of the customer or one or more like customers, or a combination of the relevance of the items 925A-4, 925A-3, 925A-1, 925A-2 to the search query 902A and one or more preferences of the customer or like customers.

Figure 9D:
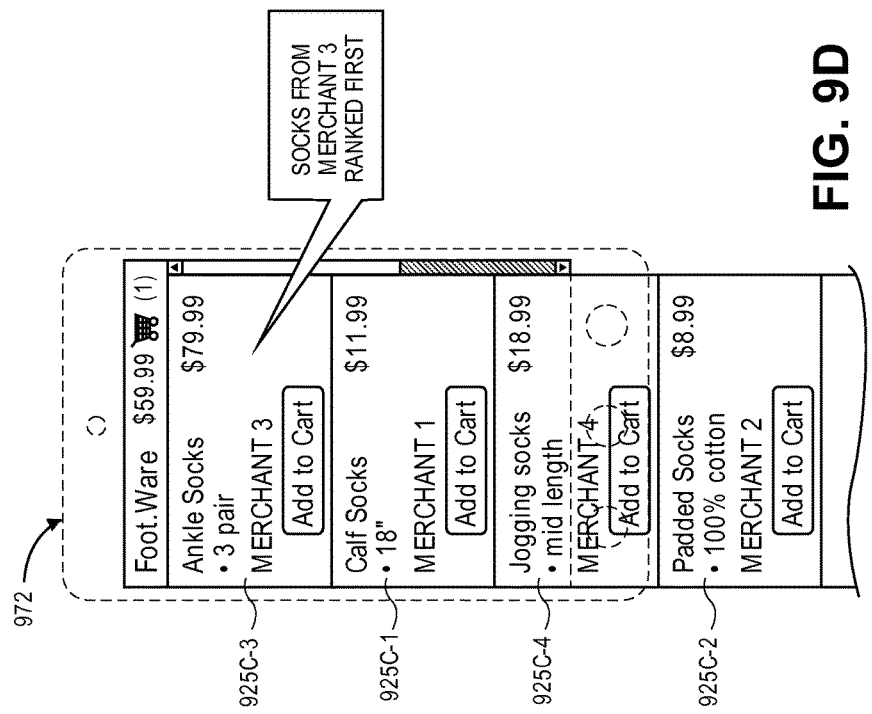
Figure 9C:
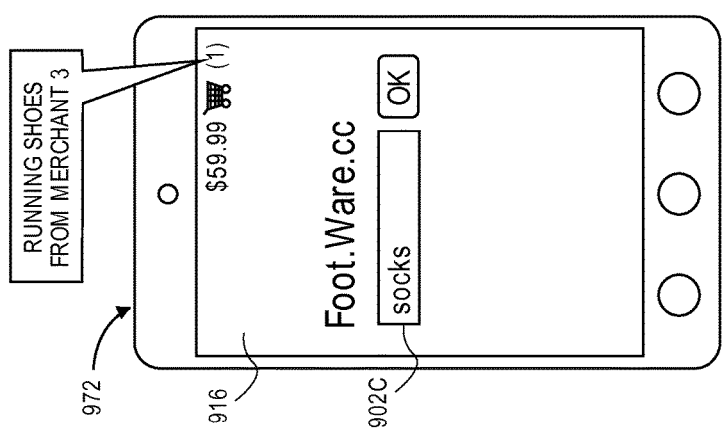

Referring to FIGS. 9C and 9D, after the customer selects one or more of the items 925A-4, 925A-3, 925A-1, 925A-2 (viz., the item 925A-3), an item associated with the selected item 925A-3 is added to the virtual shopping cart, and the customer may continue to search for additional items based on one or more other search queries. As is shown in FIG. 9C, the customer may enter a search query 902C (viz., "socks") at the web page 916, which has been updated to reflect an addition of an item associated with the item 925A-3 to the virtual shopping cart. The search query 902C may then be provided from the smartphone 972 to the online marketplace (not shown). As is shown in FIG. 9D, upon receiving the search query 902C, the online marketplace may return a list of items 925C-3, 925-C-1, 925C-4, 925C-2 pertaining to the query 902C. The items 925C-3, 925-C-1, 925C-4, 925C-2 may be ranked in an order which preferentially includes the item 925C-3, which is made available by the same merchant who made the item 925A-3 available at the marketplace, ranked highest among the items 925C-3, 925-C-1, 925C-4, 925C-2.

Figure 9E:
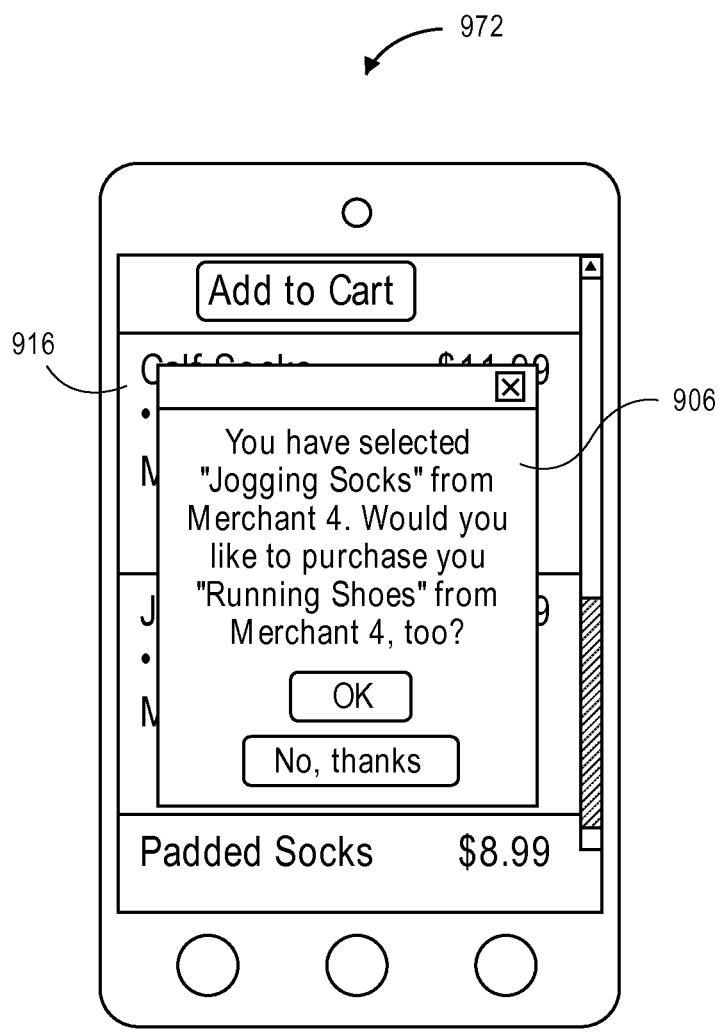

When the customer selects the item 925C-4, which is made available at the online marketplace from a merchant other than the merchant associated with the item 925A-3 that was selected in FIG. 9B, the customer may be prompted to substitute the item 925A-3 for another item offered by that merchant. As is shown in FIG. 9E, a window 906 or other feature may be displayed above or within the web page 916, prompting the customer to substitute an item offered by the merchant that offered the selected item 925C-4 for the selected item 925A-3. Alternatively, the window 906 or other feature may prompt the customer to substitute an item offered by the merchant that offered the selected item 925A-3 for the selected item 925C-4. For example, such a window may act as a supplemental means for prompting a customer to ensure that a requirement of a merchant may be met or exceeded. For example, if the customer overlooked or otherwise opted not to select an item preferentially ranked within a list, a window, such as the window 906 of FIG. 9E, may prompt the customer to again consider choosing one or more items that may meet or exceed a requirement of a merchant that offered another of the items previously selected by the customer.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although some of the embodiments of the present disclosure are shown as ranking search results or recommendations in response to search queries for short-term delivery orders received by an online marketplace, the systems and methods disclosed herein are not so limited, and may be used to preferentially rank search results in response to any type or form of search query provided to any type or form of search engine.

Furthermore, the requirements of merchants or other sources of items need not relate to thresholds of minimum prices or numbers of items. For example, where a customer enters a search query for airline tickets to a given destination to a marketplace or online travel agency operated by one or more airlines, routes or tickets which would maximize a number of airline rewards points granted to the customer may be ranked preferentially higher than other routes or tickets to the same destination. Additionally, the requirements disclosed herein may be any type or form of limits, restrictions, constraints, prerequisites or other requirements in order to proceed with a given transaction. For example, a requirement may be insurmountable in nature, such that a failure to meet or exceed the requirement voids or cancels a transaction, or the requirement may be associated with a surcharge of time or money.

Those of ordinary skill in the pertinent arts will recognize that search results may be emphasized within a list by any means in accordance with the present disclosure, including not only the order of the respective search results but also the font, size or manner in which the search results are displayed, which may preferentially incentivize or disincentivize selections of items which would, or would not, satisfy a given requirement. Likewise, although some of the embodiments described herein result in the display of search results following the entry of a text-based keyword into a text box or other aspect of a search engine associated with an online marketplace, those of ordinary skill in the pertinent arts will recognize that the display of such results may be caused in any manner, including but not limited to a selection of a keyword in a list or from a drop-down menu.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIGS. 3, 5, 7 and 8, the order in which the boxes or steps of the methods or processes are listed is not intended to be construed as a limitation on the claimed inventions, and any number of the boxes or steps can be combined in any order and/or in parallel to implement the methods or processes described herein. Also, the drawings herein are not drawn to scale, and do not limit, in any way, the number, type or style of search results that may be ranked in accordance with the present disclosure, or the computer devices, systems or networks by which such results may be provided.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or boxes or steps. In a similar manner, terms such as "include," "including" and "includes" are generally intended to mean "including, but not limited to." Thus, such conditional language is not generally intended to imply that features, elements and/or boxes or steps are in any way required for one or more embodiments or that one or more embodiments necessarily include logic for deciding, with or without user input or prompting, whether these features, elements and/or boxes or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A computer-implemented method comprising:
   receiving, by at least one computer server associated with an online marketplace, information regarding a first search query from a computer device associated with a customer over at least one network via at least a first user interface, wherein the first user interface is rendered on a display of the computer device, and wherein the first user interface is associated with one of a network site of the online marketplace or a dedicated shopping application of the online marketplace executed by the computer device;
   identifying, by the at least one computer server, a first plurality of items based at least in part on the first search query;
   transmitting, by the at least one computer server, code for rendering a display of at least a second user interface on the display to the computer device over the at least one network, wherein the second user interface comprises information regarding at least some of the first plurality of items;
   receiving, by the at least one computer server, information regarding a selection of a first item from the computer device over the at least one network via the second user interface, wherein the first item is one of the at least some of the first plurality of items;
   identifying, by the at least one computer server, a first source of the first item;
   identifying, by the at least one computer server, a first requirement associated with the first source;
   receiving, by the at least one computer server, information regarding a second search query from the computer device over the at least one network via the second user interface;
   identifying, by the at least one computer server, a second plurality of items based at least in part on the second search query;
   defining, by the at least one computer server, a ranking of the second plurality of items based at least in part on the first requirement; and
   transmitting, by the at least one computer server, code for rendering a display of at least a third user interface on the display to the computer device over the at least one network, wherein the third user interface comprises information regarding at least some of the second plurality of items displayed according to the ranking of the second plurality of items.

2. The computer-implemented method of claim 1, wherein transmitting the code for rendering the display of at least the second user interface comprises:
   identifying, by the at least one computer server, information regarding the customer; and
   defining, by the at least one computer server, a ranking of the first plurality of items based at least in part on the information regarding the customer,
   wherein the second user interface comprises information regarding at least some of the first plurality of items displayed according to the ranking of the first plurality of items.

3. The computer-implemented method of claim 1, further comprising:
   identifying, by the at least one computer server, information regarding the customer,
   wherein the ranking of the second plurality of items is defined based at least in part on the information regarding the customer and at least one of the first source of the first item or the first requirement associated with the first source.

4. The computer-implemented method of claim 1, wherein the first requirement is a first minimum cost threshold for items purchased from the first source, and
   wherein identifying the first requirement associated with the first source further comprises:
   determining, by the at least one computer server, a first cost of the first item; and
   determining, by the at least one computer server, that the first cost of the first item is less than the first minimum cost threshold.

5. The computer-implemented method of claim 4, further comprising:
   in response to determining that the first cost is less than the first minimum cost threshold, determining, by the at least one computer server, a difference between the first minimum cost threshold and the first cost;

identifying, by the at least one computer server, a second item having a second cost, wherein the second item is one of the at least some of the second plurality of items, wherein a second source of the second item is the first source, and wherein the second cost is not less than the difference between the first minimum cost threshold and the first cost; and placing, by the at least one computer server, the second item above a third item in the ranking of the second plurality of items, wherein the third item is one of the at least some of the second plurality of items, and wherein a third source of the third item is not the first source.

6. The computer-implemented method of claim 5, further comprising:

identifying, by the at least one computer server, a second requirement associated with the third source, wherein the second requirement is a third minimum cost threshold for items purchased from the third source;

in response to determining that the first cost is less than the first minimum cost threshold,
determining, by the at least one computer server, a third cost of the third item;
determining, by the at least one computer server, that the third cost of the third item is less than the third minimum cost threshold; and
in response to determining that the third cost is less than the third minimum cost threshold,
defining, by the at least one computer server, the ranking of the second plurality of items based at least in part on the first requirement and the second requirement.

7. The computer-implemented method of claim 6, further comprising:

determining, by the at least one computer server, a difference between the third minimum cost threshold and the third cost;

identifying, by the at least one computer server, a fourth item having a fourth cost, wherein the fourth item is one of the at least some of the second plurality of items, wherein a fourth source of the fourth item is the first source, and wherein the fourth cost is less than the difference between the first minimum cost threshold and the first cost;

determining, by the at least one computer server, a difference between the fourth cost and the difference between the first minimum cost threshold and the first cost;

determining, by the at least one computer server, that the difference between the third minimum cost threshold and the third cost is less than the difference between the fourth cost and the difference between the first minimum cost threshold and the first cost; and in response to determining that the difference between the third minimum cost threshold and the third cost is less than the difference between the fourth cost and the difference between the first minimum cost threshold and the first cost,
placing, by the at least one computer server, the third item above the fourth item in the ranking of the second plurality of items.

8. The computer-implemented method of claim 6, further comprising:

identifying, by the at least one computer server, a fourth item having a fourth cost, wherein the fourth item is one of the at least some of the second plurality of items, wherein a fourth source of the fourth item is the third source, and wherein the fourth cost is not less than the third minimum cost threshold; and placing, by the at least one computer server, the fourth item below the second item and above the third item in the ranking of the second plurality of items.

9. The computer-implemented method of claim 4, further comprising:

identifying, by the at least one computer server, information regarding a third item selected by the customer of the online marketplace;

identifying, by the at least one computer server, a third source of the third item based at least in part on the information regarding the third item, wherein the third source of the third item is not the first source;

identifying, by the at least one computer server, a second requirement associated with the third source;

in response to determining that the first cost is less than the first minimum cost threshold,
determining, by the at least one computer server, that the second requirement has been met; and
in response to determining that the second requirement has been met,
defining, by the at least one computer server, the ranking of the second plurality of items based at least in part on the first requirement and the second requirement.

10. The computer-implemented method of claim 9, further comprising:

determining, by the at least one computer server, a difference between the first minimum cost threshold and the first cost;

identifying, by the at least one computer server, a fourth item having a fourth cost, wherein the fourth item is one of the at least some of the second plurality of items, wherein a fourth source of the fourth item is the first source, and wherein the fourth cost is not less than the difference between the first minimum cost threshold and the first cost;

identifying, by the at least one computer server, a fifth item, wherein the fifth item is one of the at least some of the second plurality of items, and wherein a fifth source of the fifth item is the third source;

placing, by the at least one computer server, the fourth item above the fifth item in the ranking of the second plurality of items; and placing, by the at least one computer server, the fifth item above a sixth item in the ranking of the second plurality of items, wherein a sixth source of the sixth item is not the first source or the third source.

11. The computer-implemented method of claim 1, further comprising:

receiving, by the at least one computer server, information regarding a selection of a second item from the computer device over the at least one network via the third user interface, wherein the second item is one of the at least some of the second plurality of items;

determining, by the at least one computer server, a second cost of the second item;

identifying, by the at least one computer server, a second source of the second item;

identifying, by the at least one computer server, a second requirement associated with the second source, wherein the second requirement is a second minimum cost threshold for items purchased from the second source;

determining, by the at least one computer server, that the second cost of the second item is less than the second minimum cost threshold;

in response to determining that the second cost of the second item is less than the second minimum cost threshold, determining, by the at least one computer server, an aggregate cost of the first item and the second item;

determining, by the at least one computer server, that the aggregate cost of the first item and the second item is less than the second minimum cost threshold;

in response to determining that the aggregate cost of the first item and the second item is not less than the second minimum cost threshold, determining, by the at least one computer server, that the first item is available from the second source; and in response to determining that the first item is available from the second source, offering, by the at least one computer server, the first item to the customer from the second source.

12. The computer-implemented method of claim 1, wherein receiving the information regarding the second search query from the computer device over the at least one network via the second user interface further comprises:

receiving, by the at least one computer server, information regarding at least one of a second keyword or a selection of a second category from the computer device over the at least one network via the second user interface, wherein the information regarding the second search query comprises at least one of the second keyword or the second category.

13. The computer-implemented method of claim 12, wherein the at least one of the second keyword or the selection of the second category is received via an interaction with a touchscreen of a mobile device having the second user interface rendered thereon.

* * * * *